United States Patent [19]

Kanki et al.

[11] Patent Number: 5,831,403
[45] Date of Patent: Nov. 3, 1998

[54] CONTROLLER FOR AN AUTOMATIC DOOR SYSTEM

[75] Inventors: Hisayuki Kanki, Kobe; Naoki Taguchi, Akashi; Shinji Michimoto, Kobe; Kazuhiro Oba, Murayama, all of Japan

[73] Assignee: Nabco Limited, Kobe, Japan

[21] Appl. No.: 808,490

[22] Filed: Feb. 27, 1997

[30] Foreign Application Priority Data

Feb. 28, 1996 [JP] Japan ..................................... 8-069153
Jan. 17, 1997 [JP] Japan ..................................... 9-019716

[51] Int. Cl.⁶ ..................................................... H02P 7/00
[52] U.S. Cl. ........................................... 318/286; 318/274
[58] Field of Search ................................... 3318/280–286, 3318/466–470, 274, 362, 699; 49/26, 28, 118; 160/291, 292, 293.1; 187/30, 31, 34, 103, 104

[56] References Cited

U.S. PATENT DOCUMENTS

| 4,090,113 | 5/1978 | Ogishi | 318/282 |
| 4,342,378 | 8/1982 | Hmelovsky | 187/316 |
| 4,563,624 | 1/1986 | Kornbrekke et al. | 318/283 |
| 4,713,591 | 12/1987 | McCloskey | 318/257 |
| 4,980,618 | 12/1990 | Milnes et al. | 318/265 |
| 5,069,000 | 12/1991 | Zuckerman | 49/28 |
| 5,278,480 | 1/1994 | Murray | 318/626 |
| 5,682,023 | 10/1997 | McHugh et al. | 187/316 |

FOREIGN PATENT DOCUMENTS

| 2-28669 | 6/1990 | Japan . |
| 6-52026 | 7/1994 | Japan . |
| 7-8159 | 1/1995 | Japan . |

Primary Examiner—Jonathan Wysocki
Attorney, Agent, or Firm—William H. Murray, Esq.

[57] ABSTRACT

An automatic door system includes a motor which drives a door to open and close. A CPU operating in accordance with a signal from an encoder operatively coupled to the motor detects the position of the door and prepares and applies a control signal based on the detected door position to a motor drive unit. The motor drive unit alternately drives and brakes the motor. The CPU calculates the speed of the door at a particular door position on the basis of the signal from the encoder and operates to make the door speed equal to the aimed speed for the current door position.

14 Claims, 13 Drawing Sheets

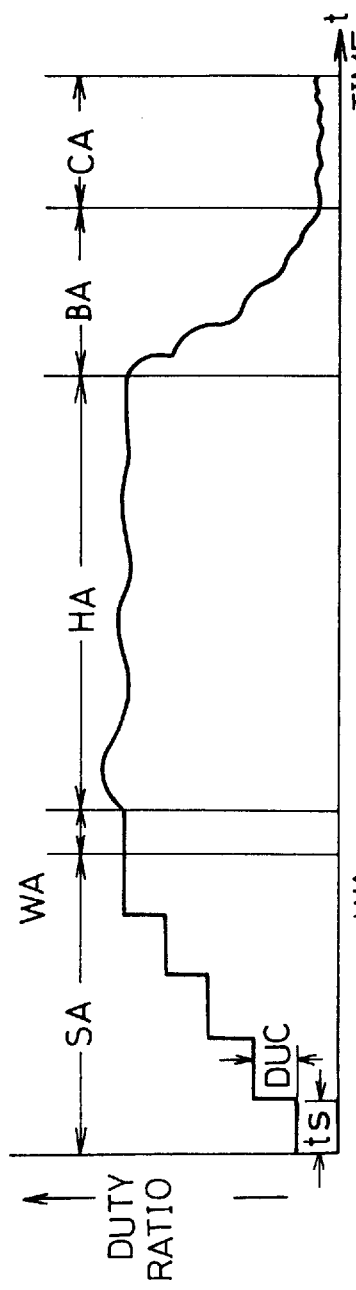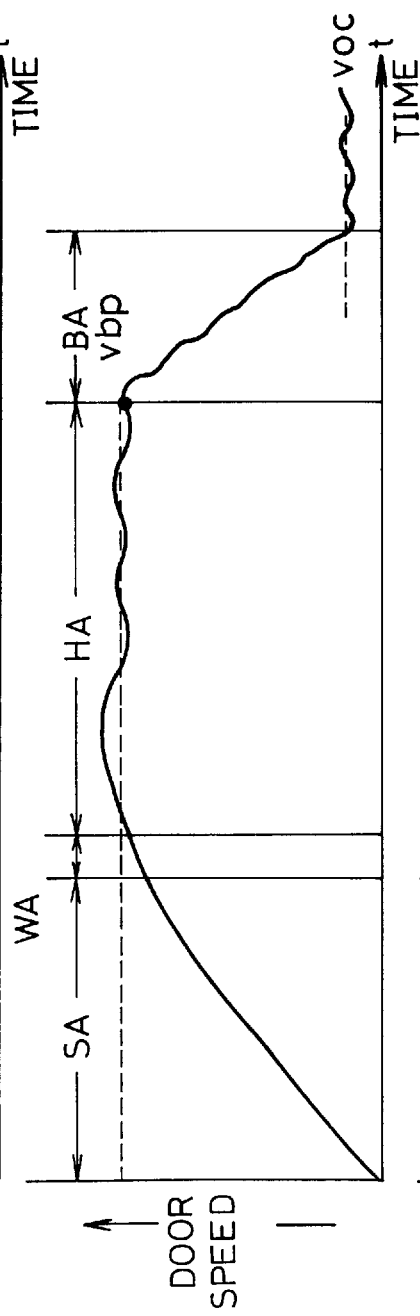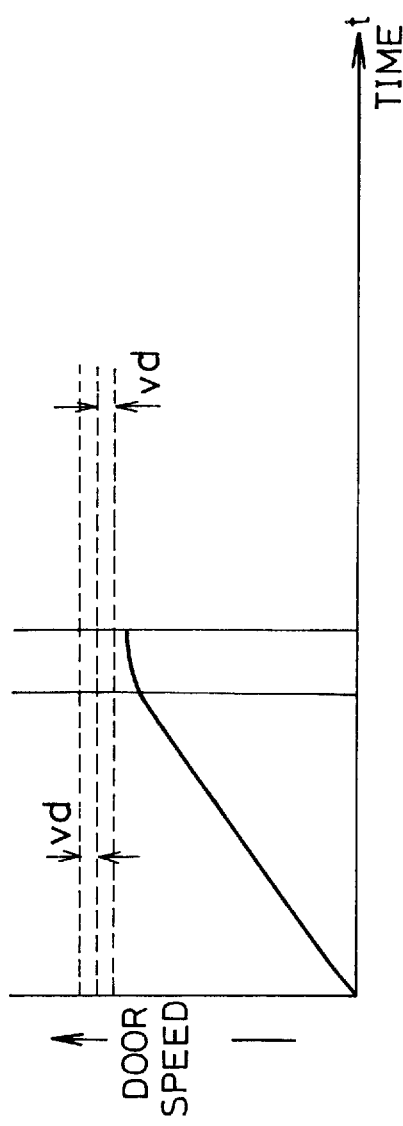

CONTROLLER FOR AN AUTOMATIC DOOR SYSTEM

This application is based on Japanese Patent Application No. HEI 8-69153 which was filed on Feb. 28, 1996 and Japanese Patent Application No. HEI 9-19716 which was filed on Jan. 17, 1997 with domestic priority claimed from the former one, the contents of which are incorporated hereinto by reference.

This invention relates to an automatic door controller for controlling a door of an automatic door system.

BACKGROUND OF THE INVENTION

One example of an automatic door system is an automatic sliding door system. When a sliding door is moved from its fully closed position to fully opened position, the speed is controlled to change in the following manner, for example. First, the door speed is increased gradually, and, when the door speed reaches a relatively high constant speed, that speed is maintained. Then, when the door moves to a door position near the fully opened position, the door speed is controlled to gradually decrease from the constant speed until it reaches a relatively low speed. Thereafter, the door moves at the relatively low speed to the fully opened position. Similar control is done when the door is moved from the fully opened position to the fully closed position.

Various types of door speed control have been proposed. For example, Japanese Examined Patent Publication No. HEI 6-52026 published on Jul. 6, 1994 discloses a door which is driven by a motor. The motor generates door driving rotation torque having a magnitude determined in accordance with the duty ratio of a PWM signal applied to the motor. An optimum acceleration range of distances over which the door may travel, being accelerated, and an optimum deceleration range of distances over which the door may travel, being decelerated, are predetermined. When the door is opened or closed, an actual acceleration travel distance which is a distance over which the door actually has traveled, being accelerated, and an actual deceleration travel distance which is a distance over which the door actually has traveled, being decelerated, are measured. After the door opening or closing operation, it is determined whether or not the actual acceleration travel distance is within the optimum acceleration range of distances. If not, the duty ratio of the PWM signal is increased or decreased by one step to change the rotation torque. Similarly, it is determined whether or not the actual deceleration travel distance is within the optimum deceleration range of distances. If not, the duty ratio of the PWM signal is increased or decreased by one step to change the rotation torque.

According to this controlling technique, however, in order to change the rotation torque for driving the door during an opening operation or closing operation, the door must have moved at least once from the fully closed to fully opened positions or from the fully opened to fully closed positions. Accordingly, if, for example, a human passing through the doorway pushes the door in the direction the door is moving, so that the door speed exceeds an aimed or desired speed, the door speed cannot be returned to the aimed speed in a real time manner. Particularly, if the door speed increases when the door is being decelerated, the door may crash into a doorpost or doorjamb. If the wind blows toward the door surface, the sliding resistance of the door may change, so that the door may not be moved at an aimed speed. Even in such a case, the door speed cannot be corrected in a real time manner.

In addition, according to this technique, in order for the door to become decelerated over a distance within the optimum deceleration range of distances, the door must be opened or closed a number of times. Accordingly, it takes a time before the door operates within the optimum deceleration range of distances. Therefore, if the same person passes through the doorway several times, he or she will be embarrassed because the door speed is different every time he or she passes.

Another example of door controlling technique is disclosed in Japanese Examined Patent Publication No. HEI 2-28669 published on Jun. 26, 1990. According to this technique, a deceleration end position is stored in a storage. The deceleration end position is a position where the door deceleration is ended and the door starts moving at a constant low speed. When the door is actually operated, the distance over which the door has moved at the constant low speed is measured. In accordance with the difference between the measured distance and an optimum distance over which the door is to move at the constant low speed, the deceleration end position is changed. This technique has problems similar to the ones encountered in the technique disclosed in the aforementioned Japanese Examined Patent Publication No. HEI 6-52026.

Japanese Examined Patent Publication No. HEI 7-8159 published on Jan. 30, 1995 discloses another type of a door control system. According to this technique a pulse signal including pulses generated at time intervals which are in inverse proportion to the speed of a door is used. The number of pulses generated in a predetermined time period during one closing or opening operation is counted, and, after that closing or opening operation is completed, the counted pulse number is compared with a preset value. In accordance with the result of comparison, the duty ratio of a pulse signal for controlling a door braking device is changed. The door braking device is intermittently operated in the next closing or opening operation in accordance with the change of the duty ratio.

According to this technique, too, the duty ratio of the pulse signal is adjusted gradually over a number of closing or opening operations, and, therefore, similar problems seen in the aforementioned two Japanese patent publications occur.

U.S. Pat. No. 4,563,625 issued on Jan. 7, 1986 discloses an automatic door control system in which a door is operated by a motor having its rotation torque controlled through controlling the duty ratio of a PWM signal. To increase the door speed, the duty ratio of the PWM signal is increased. A braking resistor is connected to the motor. The door speed is reduced by dynamic braking of the motor provided by the braking resistor.

According to this technique, the braking force is determined by the resistance value of the braking resistor and by the rotation speed of the motor at a time immediately before the braking resistor is connected to the motor. Accordingly, if the motor speed at the time immediately before the braking resistor is connected to the motor differs from a nominal value due to influence, for example, of change in sliding resistance of the door, a braking distance over which the door moves at a decreasing speed until it reaches a predetermined low speed will also change from a nominal value. This may lead to a change in distance to the doorpost over which the door is to move at the low speed, which may result in collision of the door with the doorpost. Furthermore, if the braking force changes due to change in sliding resistance, for example, every time a human passes through the doorway, the door operation varies, and, therefore, he or she may be embarrassed.

If the system is arranged to have no sliding resistance change, it is still required that the value of the braking resistor be adjusted depending on the weight and size of the door. Without such adjustment of the braking resistor, a required braking distance cannot be assured. Then, the adjustment of the automatic door system to be done when it is installed becomes complicated. The sliding resistance of the door may change as time passes, which requires the value of the braking resistor to be adjusted in order to secure a desired braking distance. Accordingly, the controller according to U.S. Pat. No. 4,563,625 requires maintenance for compensating for aging of the door.

An object of the present invention is to provide a door controller for controlling any types of doors, for example, a swing door or a sliding door, in a safe and comfortable manner.

More specifically, an object of the present invention is to provide such door controller which can prevent the door from crashing into a doorpost even when external force is exerted to the door.

Another object of the present invention is to provide a door controller which can properly control a door independently of weight and size of the door.

Still another object of the present invention is to provide a door controller which can control a door in such a manner that a human can pass through a doorway without being embarrassed by operation of the door which might otherwise vary.

A further object of the present invention is to provide a door controller which can control the moving speed of a door to a desired value without being affected by disturbances, such as the wind blowing to the door.

A still further object of the present invention is to provide a door controller which requires no special maintenance of a door in order to move the door at desired speeds at any time.

SUMMARY OF THE INVENTION

According to a first feature of the present invention, a door controller for an automatic door system is provided. The door controller is adapted to control a motor which drives a door to open and close. The controller also includes a position detecting unit which detects the position of the door in each of door opening and closing operations and develops a door position representative signal, a motor drive unit which drives the motor, and a control unit which provides a control signal to the motor drive unit in accordance with the door position representative signal.

The control unit includes output means which develops the control signal for controlling a door speed at a position represented by the door position representative signal to an aimed speed for that door position.

Since the door controller of the present invention operates the door in accordance with an aimed speed for a particular door position, there is no need for considering conditions, such as the weight of the door and the sliding resistance of the door, other than the door speed. Accordingly, the door controller of the present invention can be used with any types of doors, such as single sliding doors, double sliding doors, single swing doors and double swing doors, and can be used with any doors of different weights.

In addition, according to the present invention, the door speed can be instantaneously brought to an aimed speed for a given door position. Even if the sliding resistance of the door changes due to external force applied to the door or due to the wind blowing to the door, the door speed can be maintained at the aimed speed.

Furthermore, because the door operation is always the same, passengers are never embarrassed by door operations which might otherwise vary each time the door is operated.

Also, even if the door system ages, which may cause the door speed to be different from the aimed speed, the motor is controlled in a sense to make the difference zero, and, therefore, no special maintenance of the door for compensating for the aging is required.

According to a first embodiment of the first feature of the present invention, the control unit provides a PWM signal to the motor drive unit, as the control signal therefor. The motor drive unit is constructed to alternately drive and brake the motor. In this case, the motor may be braked immediately after the end of driving and driven after the end of braking. This is repeated. Alternatively, the motor may be driven, and idled for a predetermined time period, and then braked. After the end of the braking period, the motor is driven again. This is repeated.

The motor drive unit may include single means for driving and braking the motor, or it may include separate means for driving the motor and for braking the motor.

The door receives a driving force and a braking force alternately. The driving and braking forces are determined by the PWM signal. Because driving and braking alternate, stable operation of the door is assured. This may be readily understood by considering the door operation where an external force in the direction of movement of the door is applied to the door when the door is moving. Let it be assumed that only door driving force is adjustable. In such a case, when the door speed becomes higher, it is only the driving force applied that can be reduced, but it is not always possible to reduce the door speed to an aimed one. On the other hand, according to this embodiment, not only the driving force but also the braking force is exerted to the door, and, therefore, it is always possible to reduce the door speed to an aimed speed. One may consider to interrupt the application of driving force to the door, and apply a braking force so that the door speed is reduced to an aimed speed. However, the application of braking force only to the door may decelerate the door abruptly, which results in jerky movement of the door. According to the first embodiment of the first feature, however, because the driving force and the braking force are alternately applied to the door, the door speed can be smoothly reduced to an aimed speed.

According to a second embodiment of the first feature, the output means provides a control signal for controlling the door speed so that it becomes an aimed speed for each of a high speed area in which the door moves at a high speed, a braking area, following the high speed area, in which the door is decelerated, and a cushioning area, following the braking area, in which the door moves at a low speed and, therefore, can stop without crashing into a doorpost. The door position representative signal indicates the area in which the door is currently moving.

If the door speed in the high speed area were not controlled and, therefore, arbitrary, it would be difficult to control the door speed in the braking area to an aimed speed for the braking area. Then, because the door is not moving at the aimed speed in the braking area, it will be difficult to control the door speed in the following cushioning area to be an aimed speed for the cushioning area.

If the door speed in the braking area, in addition to the speed in the high speed area were arbitrary, it would be difficult to bring the door speed in the cushioning area to an aimed speed. In such cases, the door would crash into a doorpost or a structure where the door is installed.

In order to prevent it, according to the second embodiment of the first feature of the present invention, the door speed is controlled for each of the high speed area, the braking area and the cushioning area so as to attain an aimed speed for each of the areas, and, therefore, the door is prevented from crashing into the doorpost.

According to a second feature of the present invention, a controller is adapted to control a motor which drives a door to open and close. The controller includes a motor drive unit for driving the motor, and a control unit for providing a PWM signal to the motor drive unit. The PWM signal causes the motor to drive the door to move, being accelerated to a higher speed, in an accelerating area, and causes the motor to drive the door to move at the higher speed in a high speed area following the accelerating area. The control unit includes approximating means for approximating the PWM signal at the point of transition from the accelerating area to the high speed area in each of opening and closing operations of the door to the stabilized PWM signal generated during the high speed area in the immediately preceding corresponding (i.e. opening or closing) door operation. The stabilized PWM signal during the high speed area may be a PWM signal maintained substantially constant by feedback control, or an averaged PWM signal, as described later.

According to the second feature of the invention, the PWM signal at the transition from the accelerating area to the high speed area in a current door operation is approximated to the stabilized PWM signal during the high speed area in the immediately preceding corresponding door operation, so that the door can smoothly move from the accelerating area into the high speed area.

The sliding resistance of a door may change as a result of long use. Accordingly, if the PWM signal at the transition from the accelerating area to the high speed area is fixed to a value determined in accordance with the initial sliding resistance, the difference between the fixed PWM signal value and the PWM signal value required for obtaining an aimed speed becomes greater due to change of the sliding resistance with the door age. As a result, it may be difficult to make the door speed in the high speed area equal to the aimed speed, and, therefore, the transition from the accelerating area to the high speed area is not smooth.

According to the second feature, however, the PWM signal at the transition point from the accelerating area to the high speed area in each of the door opening and closing operations is approximated to the stabilized PWM signal during the high speed area in the preceding corresponding door operation, the door can smoothly move from the accelerating area to the high speed area.

The wind blowing against the door may affect the door speed in the high speed area. If the PWM signal for the transition is fixed, the PWM signal for bringing the door to the aimed speed differs greatly from the fixed PWM signal. Such problem can be avoided by the second feature of the present invention.

According to a first embodiment of the second feature of the present invention, the control unit includes means for gradually increasing the value of the PWM signal in each of the door opening and closing operation to the stabilized PWM signal value in the high speed area in the preceding corresponding door operation. This gradual increase is started at the starting point of the accelerating area and continues to the transition point between the accelerating area and the high speed area.

The stabilized PWM signal during the high speed area may be a PWM signal maintained substantially constant by feedback control, or an averaged PWM signal.

The gradual increase of the PWM signal value may be effected by, for example, using a fixed increment and an variable number of incremental steps. Alternatively, the PWM signal value may be increased by using a variable increment and a fixed number of incremental steps, or may be increased by increasing the value by a fixed increment, keeping an incremented value for a given period, thereafter, increasing the incremented value by the fixed increment, and repeating it.

According to the first embodiment of the second feature, the PWM signal value in the accelerating area in each of door opening and closing operations is gradually increased to the stablilized value in the high speed area in the preceding corresponding door operation, and, therefore, no substantial shock is given to the door when the door is moving in the accelerating area. Furthermore, because the door can smoothly move from the accelerating area to the high speed area, smooth door movement is realized.

According to a second embodiment of the second feature, the control unit includes means which maintains a PWM signal at the end of the accelerating area for a time period extending between the accelerating area and the high speed area.

According to the second embodiment of the second feature, the maintaining means provides a stabilizing area between the accelerating area and the high speed area where the PWM signal value at the end of the accelerating area is maintained. In this stabilizing area, the door attains a speed approximating to the speed corresponding to the maintained PWM signal value. Thus, door movement in the high speed area becomes smooth.

Because of the inertia of the door, it takes some time for the door to attain the speed corresponding to the PWM signal. The door can attain the speed corresponding to the PWM signal in this stabilizing area. The transition from the stabilizing area into the high speed area may take place a predetermined time after the start of the stabilizing area. Alternatively, the high speed area may start when the acceleration of the door becomes zero, i.e. when the door attains the door speed corresponding to the maintained PWM signal value and the door speed stops increasing.

According to a third embodiment of the second feature of the present invention, in each of the door opening and closing operations, the control unit determines the time period of the stabilizing area in accordance with the result of the comparison, made in the preceding corresponding door operation, of the door speed at the end of the stabilizing area with the aimed speed for the high speed area.

The time period of the stabilizing area required for the door to attain the aimed speed for the high speed area depends on various conditions of the door. According to the third embodiment of the second feature, the door speed at the end of the stabilizing area is compared with the aimed speed for the high speed area, and the length of the stabilizing area is adjusted in accordance with the result of the comparison. During a transition from the accelerating area to the high speed area, the maintaining means maintains the PWM signal value for the adjusted length of the stabilizing area. This adjustment of the length of the period of the stabilizing area is repeated each time the door operates. By this adjustment, the door speed can rapidly reaches the aimed speed, so that the door can operate more smoothly in the high speed area.

According to a fourth embodiment of the second feature, the approximating means approximates the PWM signal value at the point of transition from the accelerating area to the high speed area to the average PWM signal value in the high speed area in the immediately preceding corresponding door operation.

According to the fourth embodiment of the second feature, influence of variations in value of the PWM signal in the high speed area on the transition of the door from the accelerating region into the high speed area is little. Accordingly, stable door control can be achieved, and the door can move more smoothly.

According to a fifth embodiment of the second feature, the control unit includes means for determining the PWM signal value at the point of transition from the acceleration area to the high speed area on the basis of an initial value determined in accordance with various dimensions of the door when no stabilized PWM signal value for the high speed area is available.

When no stabilized PWM signal value for the high speed area is available, for example, when power supply for the door system is first turned on, the value of the PWM signal at the transition point between the accelerating area and the high speed area is determined on the basis of various dimensions of the door. Accordingly, it is possible to know the aging of the door on the basis of the door operation immediately after the power is turned on. For example, before the power for the door is cut off, the value of the PWM signal at the transition point between the accelerating area and the high speed area in each of the door opening and closing operations is determined on the basis of the stabilized PWM signal value in the high speed area in the immediately preceding corresponding door operation. In contrast, immediately after the power is turned on, no stabilized PWM signal is available, and, therefore, the PWM signal value at the transition point is a value determined in accordance with various dimensions of the door. If the door characteristics have changed due to long use, influences given by such changes cannot be compensated by the PWM signal value and, therefore, the movement of the door is different from the movement before the power supply is turned off. Such different door movement represents the aging of the door.

According to a third feature of the present invention, a controller for controlling a motor which drives a door to open and close is provided. The controller includes a motor drive unit which drives the motor, and a control unit for providing a control signal to the motor drive unit. The control unit includes control signal generating means which generates a control signal for decelerating the door at a substantially constant rate in the braking area followed by the cushioning area and for maintaining the door speed in the cushioning area following the braking area at a value attained by the door at the transition point between the braking area and the cushioning area. The control signal generating means may provide feedback control using data relating to the door speed.

According to the third feature, the door movement in each of the braking and cushioning areas is always the same, so that passengers are not embarrassed by the door movement which could otherwise vary each time they pass through the doorway.

According to a first embodiment of the third feature of the present invention, means is provided for starting the braking control (area) at any point in a plurality of areas including the accelerating area and the high speed area following the accelerating area. The plurality of areas may include a stabilization waiting area which will be described later.

According to the first embodiment of the third feature, the door is decelerated at a constant rate in the braking area regardless of the point where the braking control is started, and the door speed at the transition point between the braking area and the cushioning areas is maintained in the cushioning area. Accordingly, the door can move without embarrassing passengers.

According to a second embodiment of the third feature, the braking area starting means determines the braking area starting point in accordance with the door speed.

According to the second embodiment of the third feature, whichever condition the door is in, it is determined on the basis of the current door speed whether or not the distance of the current door position from the fully opened or closed position of the door is equal to or greater than the sum of the braking distance (the length of the braking area) necessary to decelerate the door at the constant rate from the current speed to the speed required for the cushioning area and the length of the cushioning area.

Thus, when the braking area is started, the sum of the lengths of the braking area and the cushioning area can be secured, so that the door is prevented from crashing into the structure the door is mounted to, and the passenger's safety is secured.

According to a third embodiment of the third feature, the control signal generating means sets a plurality of aimed values to which the door is successively decelerated. The aimed values are on a constant slope between the door speed at the start of the braking area and the aimed speed for the cushioning area.

According to the third embodiment, a plurality of aimed values to which the door speed is to be successively decelerated are set along the constant slope. Accordingly, the door movement at positions near the fully closed position or the fully opened position can be always the same, which does not embarrass passengers.

BRIEF DESCRIPTION OF THE DRAWINGS

FIG. 6(a) illustrates an example of actual opening and closing operation of the door of the automatic door system shown in FIG. 1, FIG. 6(b) illustrate an example of actual changes in speed of the door of the automatic door system of FIG. 1, and FIG. 6(c) illustrates how the maintenance time in the stabilization waiting control for the door of FIG. 1 is adjusted.

DESCRIPTION OF PREFERRED EMBODIMENTS

General Description of Automatic Door System

Figure 1:
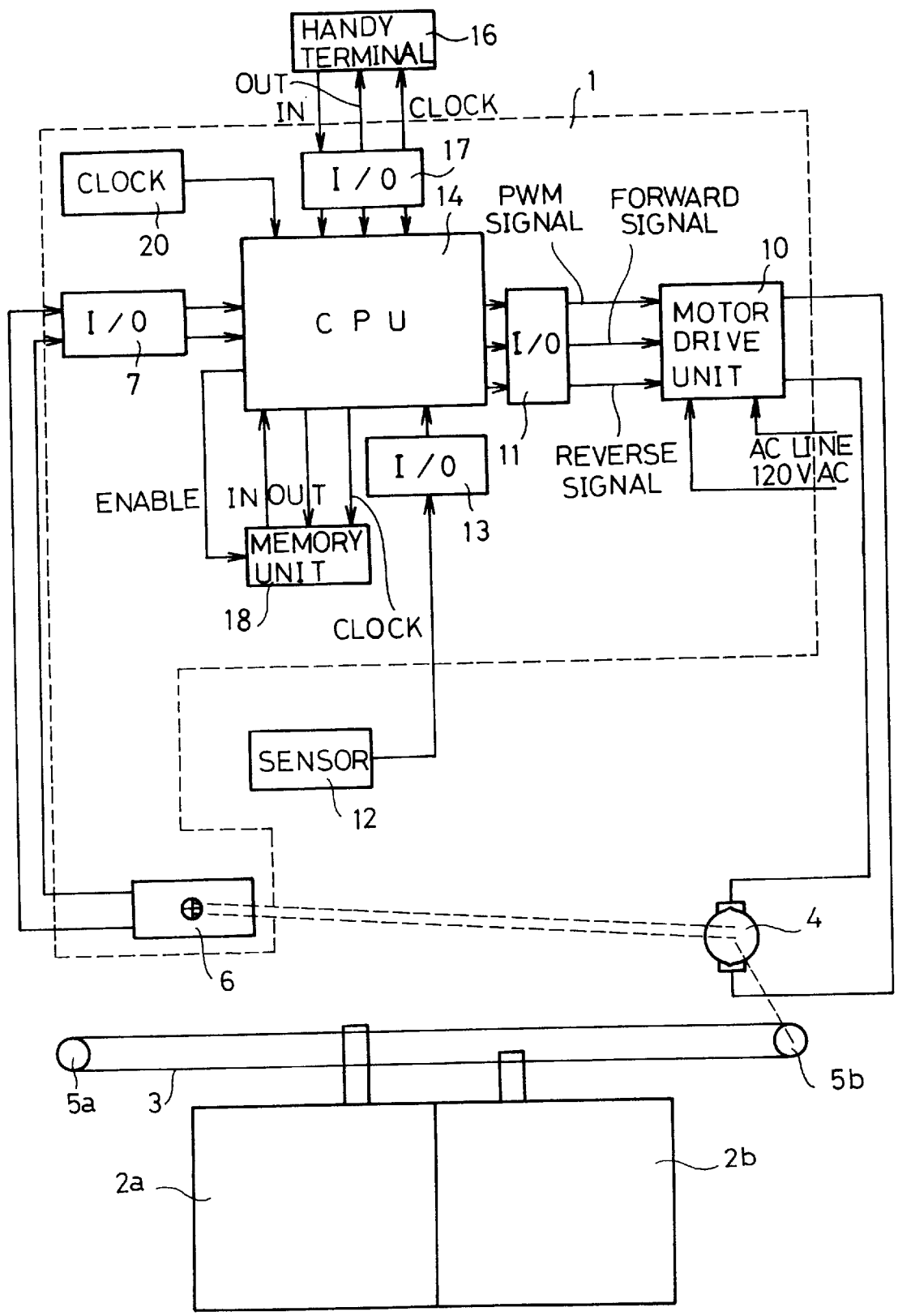
FIG. 1 is a block diagram of an automatic door system with which a door controller according to one embodiment of the present invention is used.

An automatic door system according to an embodiment of the present invention includes doors 2a and 2b as shown in FIG. 1. The doors 2a and 2b slide in opposite directions along straight paths between positions where they completely close a doorway (hereinafter referred to as fully closed positions) and positions where they completely open the doorway (hereinafter referred to as fully opened positions). The door 2a is coupled to the upper part of a loop of a drive belt 3, while the door 2b is coupled to the lower part of the loop of the belt 3. The belt 3 is looped between and around a follower pulley 5a and a drive pulley 5b. The drive pulley 5b is driven to rotate by a motor, e.g. a DC motor 4. The rotation of the motor 4 moves the doors 2a and 2b along respective straight paths in opposite directions between the fully closed positions and the fully opened positions.

The door system shown in FIG. 1 is a sliding door system. A controller according to the present invention can be used not only with a sliding door system but also other types of door systems. In addition, the controller can be used with door systems of the same type but including doors of different weights.

General Description of Controller for Automatic Door System

A controller 1 of the automatic door system controls the opening and closing operation of the doors 2a and 2b. The controller 1 includes a CPU 14. An encoder 6 is operatively coupled to the motor 4 for determining the directions of travel of the doors 2a and 2b and their respective positions. A signal from the encoder 6 is applied via an I/O unit 7 to the CPU 14. A sensor 12 senses an object, e.g. a human, who approaches the doors 2a and 2b, and generates a door operating signal. The door operating signal is also coupled via an I/O unit 13 to the CPU 14. A hand-held computer (Handy Terminal) 16 supplies various parameters to be used for operating the doors 2a and 2b, to the CPU 14 via an I/O unit 17.

The data supplied to the CPU 14 is stored in a memory unit 18. The CPU 14 performs arithmetic operations on the data stored in the memory unit 18 to generate and apply direction signals and a PWM signal to a motor drive unit 10 via an I/O unit 11.

The direction signals include a forward-direction signal and a reverse-direction signal. When the forward-direction signal is at a high (H) level, the motor drive unit 10 drives the motor 4 to rotate in such a direction as to move the doors 2a and 2b toward the fully opened positions. When the reverse-direction signal is at a high (H) level, the motor drive unit 10 drives the motor 4 to rotate in such a direction as to move the doors 2a and 2b toward the fully closed positions.

The motor drive unit 10 alternately drives and brakes the motor 4 in accordance with the PWM signal. As will be described in detail later, when the PWM signal is at a high (H) level, the motor 4 is driven to rotate, whereas, when the PWM signal is at a low (L) level, the motor 4 is braked. The ratio of the period of the H level to one entire period of the PWM signal is the duty ratio of the PWM signal. The duty ratio is adjusted to control the periods of the driving and braking of the motor 4. Through the period control, the driving force and the braking force for the doors 2a and 2b are adjusted.

Structure of Motor Drive Unit 10

Figure 2:
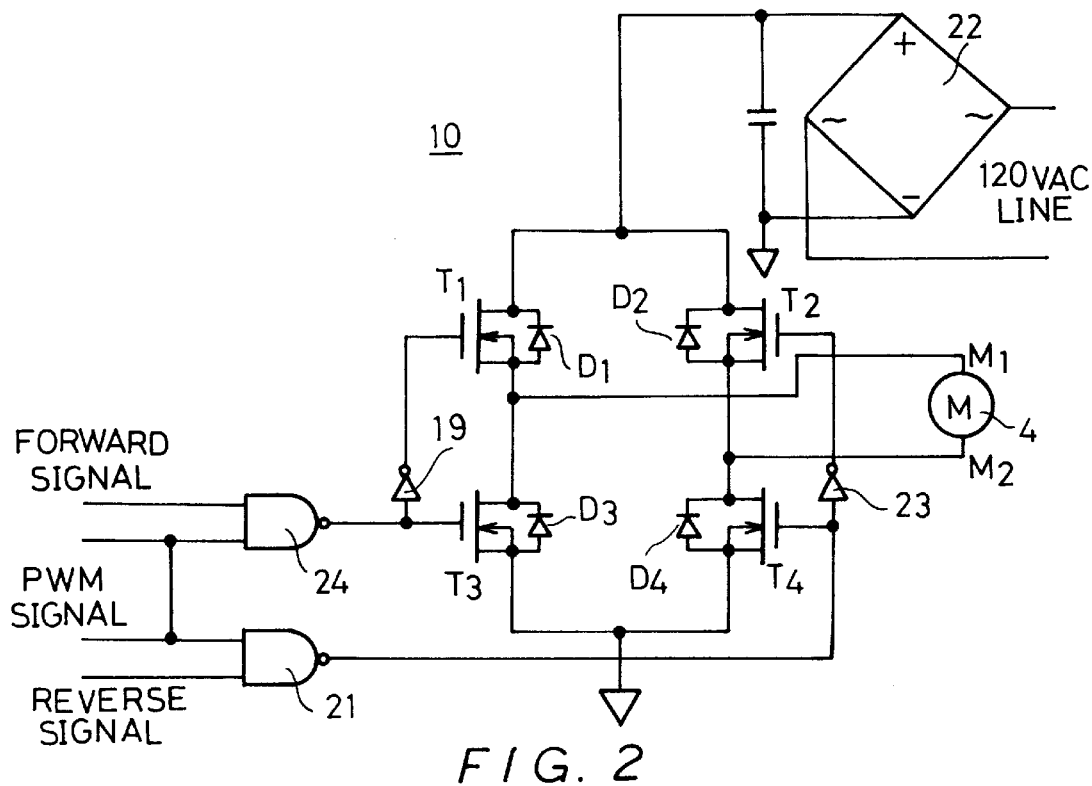
FIG. 2 is an electric circuit diagram of a motor drive unit used in the controller of FIG. 1.

As shown in FIG. 2, the motor drive unit 10 includes a bridge circuit formed of semiconductor switching elements, e.g. FET's T1 through T4. Diode D1 through D4 are connected back-to-back with the respective FET's T1 through T4. A DC voltage from a DC power supply 22 is applied between the junction of the FET's T1 and T2 and the junction of the FET's T3 and T4. One terminal M1 of the motor 4 is connected to the junction of the FET's T1 and T3, and the other terminal M2 of the motor 4 is connected to the junction of the FET's T2 and T4.

When the FET's T1 and T4 are turned on, the FET's T2 and T3 are turned off, and current flows from the DC power supply 22 through the FET T1, the motor 4 and the FET T4, which rotates the motor in the forward direction to open the doors 2a and 2b. After that, the FET's T1 and T2 are turned off and the FET's T3 and T4 are turned on, which causes counterelectromotive force to be generated in the motor 4. The counterelectromotive force causes current to circulate through the FET T3, the diode D4 and the motor 4, which dynamically brakes the motor 4.

When the FET's T2 and T3 are turned on and the FET's T1 and T4 are turned off, current flows from the DC power supply 22 through the FET T2, the motor 4 and the FET T3, so that the motor 4 rotates in the reverse direction to close the doors 2a and 2b. After that, the FET's T1 and T2 are turned off and the FET's T3 and T4 are turned on, so that counterelectromotive force is generated in the motor 4. Current due to the counterelectromotive force circulates through the FET T4, the diode D3 and the motor 4, which dynamically brakes the motor 4.

The diodes D3 and D4 function not only to conduct the circulating current during the braking, but also to prevent the FET's T3 and T4 from being broken by counterelectromotive force generated by the switching between the driving and braking of the motor 4. The diode D1 and D2 function to prevent the FET's T1 and T2 from being broken by counterelectromotive force generated by the switching between the driving and braking of the motor 4.

Operation of Motor Drive Unit 10

The FET's T1 through T4 are controlled in the following manner in order to drive and brake the motor 4. The forward-direction signal and the PWM signal are applied from the CPU 14 to a NAND circuit 24. The output of the NAND circuit 24 is coupled to the gate of the FET T3. The output of the NAND circuit 24 is inverted by an inverter 19 and, then, applied to the gate of the FET T1. The reverse-direction signal and the PWM signal are applied from the CPU 14 to a NAND circuit 21 which has its output coupled to the gate of the FET T4. The output of the NAND circuit 21 is inverted by an inverter 23 before it is applied to the gate of the FET T2. The FET's T1 through T4 become conductive when a H-level signal is applied to their gates.

Figure 3:
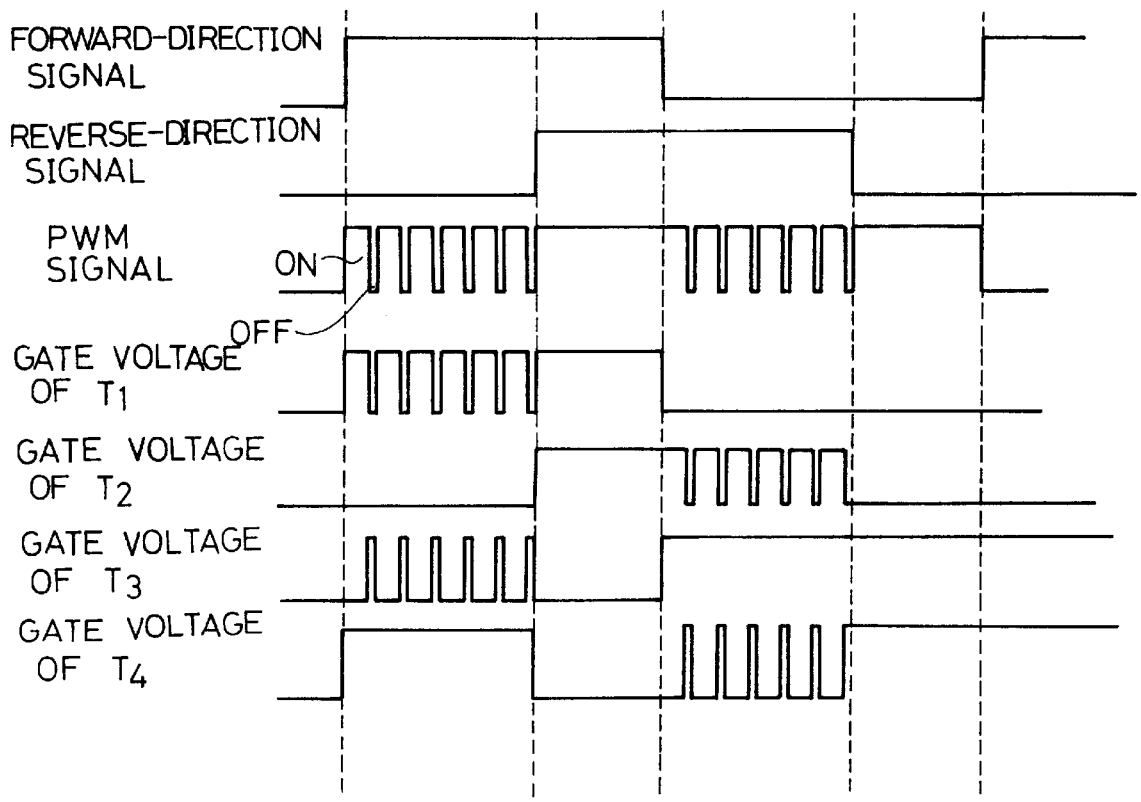
FIG. 3 shows waveforms of signals at various points in the circuit of the motor drive unit shown in FIG. 2.

When the forward-direction signal at the H level and the PWM signal are applied to the NAND circuit 24, the output of the NAND circuit 24 which is applied to the gate of the FET T3 assumes a low level (L) as shown in FIG. 3. (See the waveform of the gate voltage of T3). This renders the FET T3 non-conductive. At this time, the output of the inverter 19 which is the inverted version of the output of the NAND circuit 24 is at the H level. This H-level output of the inverter 19 is applied to the gate of the FET T1, which renders the FET T1 conductive. If, at this time, the L-level reverse-direction signal and the PWM signal are applied to the NAND circuit 21, the output of the NAND circuit 21 assumes the H-level when the PWM signal is at the H-level, which renders the FET T4 conductive. At the same time, the output of the inverter 23 is at the L-level and is applied to the FET T2 to render it non-conductive. Thus, when the forward-direction signal is at the H-level, the reverse-direction signal is at the L-level and the PWM signal is at the H-level, the FET's T1 and T4 are conductive and the FET's T2 and T3 are non-conductive, which causes the motor 4 to be driven in the forward direction.

When the PWM signal assumes the L-level, with the forward-direction signal and the reverse-direction signal being at the H-level and L-level, respectively, the output of the NAND circuit 24 is at the H-level and the output of the inverter 19 is at the L-level. This causes the FET'S T3 and T4 to be conductive and non-conductive, respectively. The output of the NAND circuit 21 remains at the H-level and, therefore, the output of the inverter 23 remains at the L-level, even when the PWM signal assumes the L-level. Accordingly, the FET'S T4 and T2 remain in the conductive state and the non-conductive state, respectively. Thus, when the forward-direction signal is at the H-level, the reverse-direction signal is at the L-level and the PWM signal is at the L-level, the FET's T3 and T4 are conductive and the FET's T1 and T2 are non-conductive, which results in the braking of the motor 4.

Similarly, with the forward-direction signal and the reverse-direction signal being at the L-level and the H-level, respectively, the PWM signal at the H-level renders the FET's T2 and T3 conductive and renders the FET's T1 and T4 non-conductive. This results in the rotation of the motor 4 in the reverse direction. With the forward-direction signal and the reverse-direction signal being at the L-level and the H-level, respectively, the PWM signal at the L-level renders the FET's T3 and T4 conductive and renders the FET's T1 and T2 non-conductive. This results in the braking of the motor 4.

Since the PWM signal assumes the H-level and L-level alternately, the motor 4 is alternately driven and braked whichever direction it is being rotated, in the forward direction or in the reverse direction. The duty ratio of the PWM signal is changed to alter the period when the motor is driven to rotate (i.e. the H-level period of the PWM signal), so that the driving force of the motor 4 is adjusted. In this case, the period during which the motor 4 is dynamically braked (i.e. the L-level period of the PWM signal) is also changed accordingly, and, therefore, the braking force applied to the motor 4 is also altered. The control in which the motor is alternately driven and braked is referred to as drive-and-brake control in this specification.

In the illustrated embodiment, the driving and braking of the motor 4 are controlled by the motor drive unit 10, but separate units may be used for driving and braking controls for the motor. In such a case, the driving unit and the braking unit must be controlled in such a manner that the driving and the braking of the motor 4 alternate.

Basic Operation of Doors 2a and 2b

The doors 2a and 2b move symmetrically with respect to the vertical axis passing through the center of the width of the doorway. Accordingly, hereinafter, the operation of only one, 2a, of the two doors 2a and 2b is described.

Figure 4:
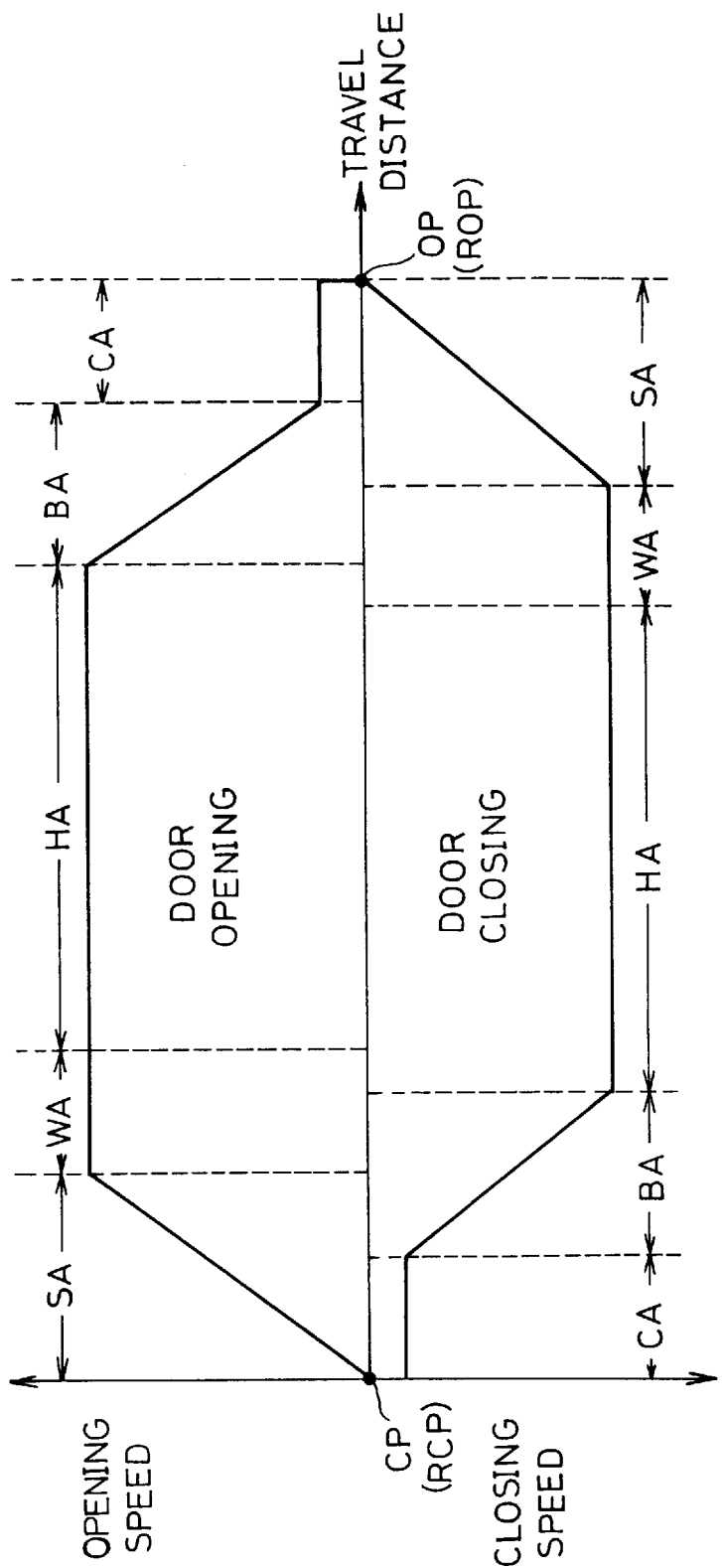
FIG. 4 illustrates an ideal door opening and closing operation of the door of the automatic door system shown in FIG. 1.

FIG. 4 illustrates the relationship between the speed of the door 2a and door positions in opening and closing operations of the door 2a when it reciprocates in an ideal fashion between the fully opened position OP and the fully closed position CP. As is understood from FIG. 4, in the opening operation, the door 2a moves from the fully closed position CP through a soft-start control area SA, a stabilization waiting control area WA, a high-speed control area HA, a braking control area BA, and a cushioning control area CA to the fully opened position OP. In the closing operation, the door 2a moves from the fully opened position OP through a soft-start control area SA, a stabilization waiting control area WA, a high-speed control area HA, a braking control area BA, and a cushioning control area CA to the fully closed position CP.

The CPU 14 compares the speed of the door 2a with the aimed speed for a current position of the door in each of the high-speed area HA, the braking control area BA and the cushioning control area CA, and adjusts the duty ratio of the PWM signal to make the difference between the actual speed and the aimed speed zero in a feedback control manner. By this feedback control, the door speed can be controlled in a real-time fashion. In this respect, the feedback control of the present invention is different from a control for adjusting the driving force of the motor 4 on the basis of the difference between the actual speed of the door 2a and the aimed speeds after the door 2a has moved from the fully opened position OP to the fully closed position CP or after the door 2a has moved from the fully closed position CP to the fully opened position OP.

In addition, since the CPU 14 gives both drive-and-brake control and the feedback control to the door, the door can move smoothly.

Let it be assumed that when only the driving force of the motor 4 is controlled by feedback control, the speed of the door 2a exceeds the aimed speed for some reason. In such a case, if only the driving force to the door 2a is reduced, the speed of the door 2a cannot immediately be decreased to the aimed speed because of the inertia. Therefore, the driving force must be further reduced. Then, the feedback control becomes unstable.

When the door speed exceeds the aimed speed, the driving of the motor 4 may be interrupted, and the motor 4 is controllably braked. However, if a large braking force is applied to the motor 4 to decrease the door speed against the inertia of the door 2a, the door 2a will receive a shock and will not move smoothly.

In contrast, by the use of both the drive-and-brake control and the feedback control according to the present invention, the motor 4 is alternately given a driving force and a braking force to thereby make the door speed the aimed speed without raising any problems stated above, and, accordingly, the door can move smoothly.

Control Made by CPU 14 When Doors 2a and 2b Are Installed

Figure 5:
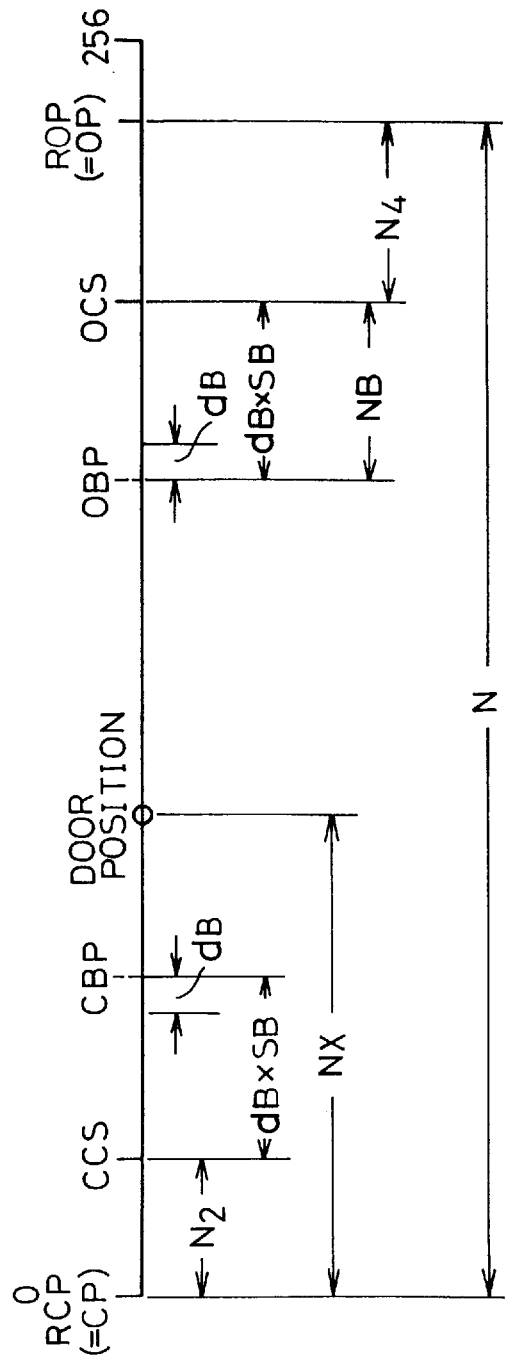
FIG. 5 illustrates various door positions the door of the automatic door system shown in FIG. 1 can assume.

A. After the automatic door system is installed, the doors 2a and 2b are manually moved to the fully opened positions OP by an engineer. After that, the hand-held computer 16 is operated to transmit a command to the CPU 14 to make the doors 2a and 2b move toward the fully closed position CP. The CPU 14 starts measuring the length of the stroke N of the doors from the fully opened position OP to the fully closed position CP on the basis of a signal provided to the CPU 14 from the encoder 6. See FIG. 5.

The encoder 6 produces a pulse every predetermined number of rotations of the motor 4. The distance each of the doors 2a and 2b travels for a given number of rotations of the motor 4 is known. Accordingly, the CPU 14 can determine the position of the doors 2a and 2b by counting the number of pulses from the encoder 6.

B. By the use of the hand-held computer 16, various parameters for the operation of the doors 2a and 2b are set. The parameters set are as follows.

$P_{oh}$: Opening Speed Parameter

This parameter corresponds to an aimed speed $V_{oh}$ in the high-speed area HA in the opening operation of the doors 2a and 2b. (Hereinafter, the aimed speed $V_{oh}$ is referred to as opening aimed high speed $V_{oh}$.) One of numbers 0 through 7 is selected for the opening speed parameter $P_{oh}$. In accordance with the selected number, the CPU 14 sets a value for the opening aimed high speed $V_{oh}$.

$P_{ch}$: Closing Speed Parameter

This parameter corresponds to an aimed speed $V_{ch}$ in the high-speed area HA in the closing operation of the doors 2a and 2b. (Hereinafter, the aimed speed $V_{ch}$ is referred to as closing aimed high speed $V_{ch}$.) One of numbers 0 through 7 is selected for the closing speed parameter $P_{ch}$. In accordance with the selected number, the CPU 14 sets a value for the closing aimed high speed $V_{ch}$.

$P_{oc}$: Opening Cushioning Speed Parameter

This parameter corresponds to an aimed speed $V_{oc}$, in the cushioning control area CA in the opening operation of the doors 2a and 2b. (Hereinafter, the aimed speed $V_{oc}$ is referred to as opening aimed cushioning speed $V_{oc}$.) One of numbers 0 through 3 is selected for the opening aimed cushioning speed $V_{oc}$. In accordance with the selected number, the CPU 14 sets a value for the opening aimed cushioning speed $V_{oc}$.

$P_{cc}$: Closing Cushioning Speed Parameter

This parameter corresponds to an aimed speed $V_{cc}$ in the cushioning control area CA in the closing operation of the doors 2a and 2b. (Hereinafter, the aimed speed $V_{cc}$ is referred to as closing aimed cushioning speed $V_{cc}$.) One of numbers 0 through 3 is selected for the closing aimed cushioning speed $V_{cc}$. In accordance with the selected number, the CPU 14 sets a value for the closing aimed cushioning speed $V_{cc}$.

$P_T$: Open Time Parameter

When the operating signal disappears as an object is no longer sensed by the sensor 12, an open timer provided by the CPU 14 starts counting clock pulses supplied from a clock generator 20 (FIG. 1). When the count reaches a value corresponding to an "open time" period for which the doors should be kept open, the CPU 14 causes the doors 2a and 2b to be closed. An open time parameter $P_T$ sets the open time period. One of numbers 0 through 7 is selected, and the CPU 14 uses the selected number as the open time period $T_T$ (second).

$P_s$: Starting Torque Parameter

The CPU 14 successively increases the duty ratio of the PWM signal in a plurality of steps when the doors 2a, 2b are in the soft-start control area SA, as will be described later. Each duty ratio is maintained for a fixed, duty ratio maintenance time period ts. A starting torque parameter $P_s$ corresponds to the duty ratio maintenance time period ts. One of numbers 0 through 7 is selected for the starting torque parameter $P_s$, and the CPU determines a value for the duty ratio maintenance time period ts in accordance with the selected number.

$P_B$: Braking Torque Parameter

As will be described later, the CPU 14 decelerates the door 2a, 2b in a plurality of steps in the braking control area BA. An aimed speed is set for each of the steps. Each aimed speed is maintained over a predetermined, aimed-speed maintenance distance $d_B$. A braking torque parameter $P_B$ corresponds to the aimed-speed maintenance distance $d_B$. One of numbers 0 through 7 is selected for the braking torque parameter $P_B$, and the CPU 14 determines the aimed-speed maintenance distance $d_B$ in accordance with the selected number.

$P_R$: Reverse Rotation Torque Parameter

This parameter is not relevant to the subject of the present invention, and, therefore, only a brief description is given. When the sensor 12 senses an object during the closing operation of the doors 2a and 2b, the CPU 14 causes the doors 2a and 2b to be opened. To effect it, the direction of movement of the doors 2a and 2b must be reversed. In order to reverse the moving direction of the doors, it is necessary to decelerate them. The deceleration is performed stepwise with aimed speeds set for the respective steps. In each step, the aimed speed is maintained over a predetermined distance $d_R$. The parameter $P_R$ corresponds to this maintenance distance $d_R$.

One of numbers 0 through 7 is selected for $P_R$, and the CPU 14 determines the maintenance distance $d_R$ in accordance with the selected number.

These parameters are set by an operator in accordance with various dimensions of the doors, such as the weight and size of the doors.

Control Provided by Controller 1 Every Day upon Application of Power Thereto at the Beginning of Use of Automatic Door System Each time power is supplied to the controller 1, the controller 1 moves the door 2a, 2b to the fully opened position OP or to the fully closed position CP. This is done for the following reason.

When the power is first applied to the controller 1, the CPU 14 cannot determine the exact current position of the doors 2a, 2b. Though the positions of the doors 2a and 2b are stored in the memory unit 18 by the CPU 14, there is a possibility that someone may have moved the doors after the power is decoupled from the controller 1. Thus, the positions of the doors 2a and 2b stored in the memory do not always represent the positions of the doors when the power is applied.

Then, the doors 2a and 2b cannot always be controlled properly if the control is based on the door positions stored in the memory 18 when the power is supplied to the controller 1. In order to control the doors properly, each door is moved to the fully closed position CP after the power is supplied to the controller 1. This fully closed position CP is used as a reference closed position RCP which has a travel distance value zero (0). Alternatively, the doors 2a, 2b may be moved to the fully opened position OP instead of the fully closed position CP. In this case, the fully opened position OP is used as the reference opened position ROP which has a travel distance value of N. This is effected by setting the count on the counter in the CPU 14 for detecting the door position to 0 or N. Thus, the positions of the doors 2a and 2b at the start of control are established.

Whether the doors 2a and 2b are moved to the fully closed positions CP or the fully opened positions OP upon the first application of power to the controller at the beginning of the day can be determined when the door system is installed.

The CPU 14 provides various controls including the following two controls which are relevant to the subject of the present invention. (1) Control to open the doors 2a and 2b in response to a door operating signal generated by the sensor 12 in response to detection of an object, and, thereafter, to close the doors. (2) Control to decelerate the doors 2a and 2b when the doors reach an opening braking start point OBP or a closing braking start point CBP, which will be described later, while the CPU 14 is providing soft-start control or stabilization waiting control.

Detailed Description of Control (1)

The CPU 14 controls the duty ratio of the PWM signal for each of five control areas in each of the opening and closing operations of the doors shown in FIG. 4, in the following manner. The five control areas include the soft-start control area SA, the stabilization waiting control area WA, the high-speed control area HA, the braking control area BA, and the cushioning control area CA.

i. Soft-Start Control during Door Opening Operation

The soft-start control is done when a door operating signal is applied from the sensor 12 to the CPU 14 in the door opening operation. The soft-start control is to increase stepwise the duty ratio of the PWM signal by a predetermined increment $D_{UC}$, which results in increase of the door speed. That is, the doors are accelerated. For example, the duty ratio for the first step is $D_{UC}$. This duty ratio is maintained for a duty ratio maintenance time period ts which is determined by the CPU 14 in accordance with the starting torque parameter $P_s$. The duty ratio for the second step is $2 \cdot D_{UC}$, which is also maintained for the time period of ts. In the similar manner, the duty ratio is increased by the increment $D_{UC}$ in a predetermined number of steps S.

When the sensor 12 first generates a door operating signal after power is supplied to the controller 1, the total number of steps S is set by the CPU 14 to the opening speed parameter $P_{oh}$ multiplied by, for example, 2. Then, the aimed speed for the transition point between the soft-start control area and the stabilization control area is a predetermined value of $D_{UC} \cdot P_{oh} \cdot 2$.

After that, each time the sensor 12 develops second and subsequent door operating signals, the total step number S is determined by dividing by $D_{UC}$, the average duty ratio $D_{Ua}(X)$ at the end of the high-speed control which will be described later. Thus, the aimed speed at the transition point between the soft-start control area SA and the stabilization waiting control area WA has a stable value of $D_{Ua}(X)$.

FIG. 6(a) illustrates how the duty ratio of the PWM signal increases in the soft-start control area SA. With the increase of the duty ratio of the PWM signal, the door speed increases accordingly, as shown in FIG. 6(b). It should be noted that, as described previously, when the PWM signal has the H-level, the doors 2a and 2b receive the driving force, and when the PWM signal assumes the L-level, the doors 2a and 2b are braked. The door speed is gradually increased, because, even if a large duty ratio PWM signal is applied to the motor 4, the door speed does not rapidly increase due to inertia of the doors and a shock is undesirably given to the door.

ii. Stabilization Waiting Control

The stabilization waiting control follows the soft-start control. The stabilization waiting control is a control for maintaining the duty ratio of the PWM signal in the last step of the soft-start control area SA for a predetermined maintenance time period. As shown in FIG. 6(b), there is a possibility that the door speed $V_x$ may not attain the aimed speed $V_a$ even in the last step of the soft-start control. The stabilization waiting control is a control for maintaining the last-occurring duty ratio of the soft-start control for the maintenance time period until the door speed $V_x$ attains the aimed speed $V_a$.

The maintenance time period is set beforehand. However, depending on circumstances in which a particular door system is installed, the preset maintenance time period may be too short for the door speed to attain the aimed speed at the end of the stabilization waiting control area WA. Therefore, each time the stabilization waiting control ends, the door speed is compared with the aimed speed. For example, the absolute value of the difference between the two speeds is calculated, and, whether the absolute value is not greater than a predetermined value vd or not is determined. In other words, determination is made as to whether the door speed at the end of the stabilization waiting control area WA is within an allowable range of [(the aimed speed) ± vd] which is shown in FIG. 6(c).

The absolute value of the difference equal to or less than vd means that the door speed is within the range of [(the aimed speed) ± vd], and, therefore, if the maintenance time period is shortened, the door speed would be kept within the allowable range. Accordingly, the maintenance time period is decreased by a predetermined amount, and the next stabilization waiting control is effectuated on the basis of the decreased maintenance time period. Then, after the stabilization waiting control takes place a plurality of times, the maintenance time period can assume a minimum value required for making the door speed substantially equal to the aimed speed.

The difference absolute value greater than vd indicates that the door speed is out of the allowable range, and may have an overshoot or undershoot. In such a case, the maintenance time period is increased by a predetermined amount. The next stabilization waiting control is carried out on the basis of the increased maintenance time period. After the stabilization control is carried out a plurality of times, the maintenance time period attains the smallest value required for making the door speed substantially equal to the aimed speed.

The stabilization waiting control may be eliminated, and the soft-start control may be followed directly by the high-speed control.

iii. High-Speed Control

The high-speed control follows the stabilization waiting control. In the high-speed control area HA, each time the door speed $V_x$ is determined, the door speed $V_x$ is feed-back controlled so as to become an opening aimed high speed determined by the CPU 14 in accordance with the opening speed parameter $P_{oh}$. Specifically, the duty ratio $D_U(X)$ of the PWM signal to be applied to the motor drive unit 10 is calculated by the following equation (1) on the basis of the duty ratio $D_U(X-1)$ in the immediately preceding door opening operation, the current speed $V_x$ of the door 2a, 2b, the opening aimed high speed $P_{oh}$, and a factor K.

$$D_U(X)=D_U(X-1)-K(V_x-V_{oh}) \qquad (1)$$

The factor K is a factor for converting a speed to a duty ratio. The speed of the motor 4 is controlled in accordance with the calculated duty ratio $D_U(X)$.

In parallel with this calculation, the CPU 14 calculates the average duty ratio $D_{Ua}(X)$ by the following equation (2).

$$D_{Ua}(X)=[D_U(X)+D_{Ua}(X-1)]/2 \qquad (2)$$

The term $D_{Ua}(X-1)$ represents the average duty ratio in the immediately preceding door opening operation. For the initial high-speed control, the average duty ratio $D_{Ua}(X-1)$ of the preceding opening operation is not available, and, therefore, the duty ratio $D_U(X)$ is used as $D_{Ua}(X-1)$. The average duty ratio $D_{Ua}(X)$ is used in calculation of the total steps for the soft-start control of the next opening operation. The average duty ratio $D_U(X)$ may be calculated by any other known techniques than the use of the equation (2).

The door speed $V_x$ is determined from the signal provided by the encoder 6. Specifically, the CPU 14 counts the number of clock pulses the clock generator 20 produces in a time period from the time at which one pulse from the encoder 6 rises to a time period at which the next pulse rises, i.e. in one period of the pulse signal from the encoder 6. As described previously, the distance the doors 2a, 2b travel in a time period from one pulse to the next generated by the encoder 6 is known, and, therefore, the speed of the doors 2a and 2b can be calculated by counting the number of clock pulses occurring in this one period.

The high-speed control continues until the ending condition represented by the following equation (3) is met.

$$N_x \geq N - N_4 - S_B \cdot d_B \qquad (3)$$

where $S_B$ is equal to $(D_U(X)/D_{UC})$, and represents the total number of steps in which the current duty ratio $D_U(X)$ is to be decreased by the amount $D_{UC}$ until it becomes $D_{UC}$. The current duty ratio $D_U(X)$ corresponds to the current door speed $V_x$. Accordingly, if the door speed is decreased from the current speed by an amount corresponding to $D_{UC}$, $S_B$ represents the number of steps required for the door speed to decrease to the speed corresponding to $D_{UC}$. In the equation (3), $d_B$ represents a predetermined maintenance distance determined on the basis of the braking torque parameter $P_B$. The duty ratio is maintained in each step for this maintenance distance. Thus, $(S_B \cdot D_B)$ represents the length $N_B$ of the braking control area BA required for the current door speed $V_x$ to decrease.

The term $N_4$ in the equation (3) represents the length of the cushioning control area CA.

Thus, the right side of the equation (3) represents the opening braking control start point OBP for the current door speed $V_x$ at which the braking control, if required, should be started. (See FIG. 5.) The left side term $N_x$ of the equation (3) represents the current door position determined by counting the output of the encoder 6 in the counter of the CPU 14. Thus, the equation (3) is to judge whether or not the current door position $N_x$ is the braking start point OBP at which the braking control must be started for the current door speed $V_x$.

The opening braking control start point OBP is not predetermined, but it is determined in accordance with the duty ratio of the PWM signal corresponding to the current speed of the door 2.

iv. Braking Control

The braking control is started when the equation (3) is fulfilled. In the braking control, an aimed speed $V_b(S)$ is determined for each step S (S being equal to a value of from 1 to $S_B$) of the total number of steps $S_B$ required for fulfilling the ending condition (3). The door speed is feed-back controlled so that the actual door speed $V_x$ becomes equal to the aimed speed $V_b(S)$.

Figure 7:
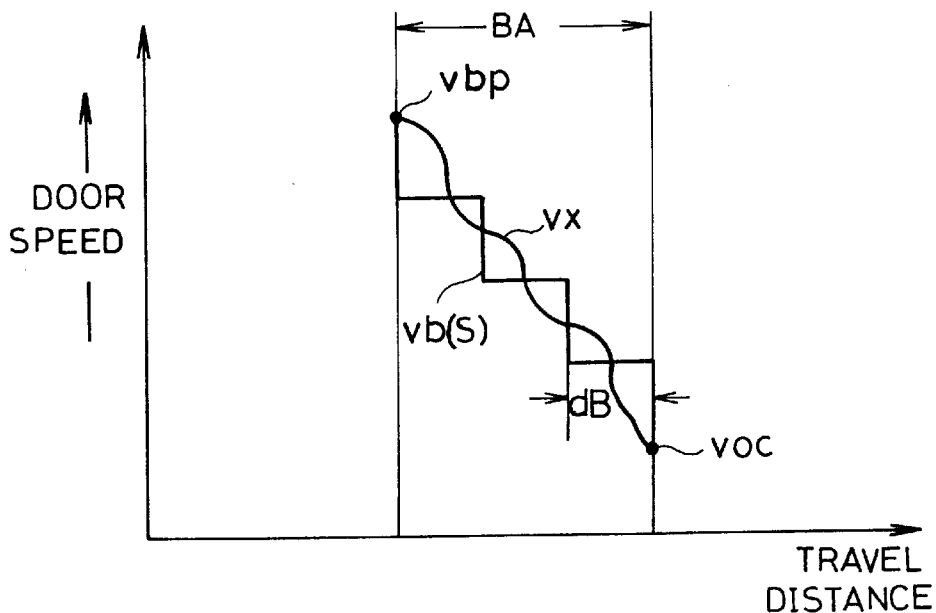
FIG. 7 illustrates a change in speed of the door in the braking area and a successively changed aimed speed in the automatic door system of FIG. 1.

Specifically, the aimed speed $V_b(S)$ for each step is determined from an equation (4).

$$V_b(S) = V_{bp} - [(V_{bp} - V_{oc})/S_B] \cdot S \qquad (4)$$

where $V_{bp}$ is the door speed at a time when the braking control is started, as shown in FIG. 6(b), $V_{oc}$ is the opening aimed cushioning speed determined by the opening cushioning speed parameter $P_{oc}$, and S is a value representing the step number increasing one by one from 1 to $S_B$. S is successively increased by one as the doors 2a and 2b travel by the maintenance distance $d_B$. Thus, as the doors 2a and 2b travel the distance $d_B$, the aimed deceleration speed decreases by $(V_{bp} - V_{oc})$, and, therefore, the slope or rate of deceleration is constant. The speed control is carried out in accordance with the following equation (5).

$$D_U(X) = D_U(X-1) - K(V_x - V_b(S)) \qquad (5)$$

where K is a factor for converting $(V_x - V_b(S))$ to a duty ratio. The braking control continues until $V_b(S)$ becomes equal to $V_{oc}$. As a result of the braking control, the doors 2a and 2b are smoothly decelerated at a substantially constant rate, i.e. with a substantially constant slope. Thus, the door speed can be reduced to the opening aimed cushioning speed $V_{oc}$ at an opening cushioning control start position OCS where the cushioning control during an opening operation of the doors is started. FIG. 7 shows changes of $V_b$ and $V_x$ in the braking control area BA.

V. Cushioning Control

The cushioning control starts after $V_b(S)$ becomes equal to $V_{oc}$. The cushioning control is a feedback control for bringing the door speed to be equal to the aimed speed $V_{oc}$ set for the transition point between the braking control area BA and the cushioning control area CA. This control is carried out in accordance with the following equation (6) each time the door speed $V_x$ is measured.

$$D_U(X) = D_U(X-1) - K(V_x - V_{oc}) \qquad (6)$$

The cushioning control is ended when $V_x$ becomes 0 and $N_x$ becomes N. With this cushioning control, the door speed can be maintained to be equal to the opening aimed cushioning speed $V_{oc}$ even when the running resistance of the door changes during its movement from the predetermined cushioning control start position OCS to the fully opened position OP.

vi. Closing Operation of Doors 2a, 2b

In closing the doors 2a and 2b, when no door operating signal is present for the open time period $T_T$ while the doors 2a and 2b are in the fully opened position OP, the soft-start control, the stabilization waiting control, the high-speed control, the braking control, and the cushioning control are carried out in the named order in a manner similar to the one described above with reference to the door opening operation. However, the parameter $P_{ch}$ is used for the soft-start control, in place of $P_{oh}$ used in the opening operation. Further, in place of $V_{oh}$, $V_{ch}$ is used for the high-speed control. $V_{ch}$ is prepared in accordance with the closing high-speed parameter $P_{ch}$. Also, in the high-speed control, the following equation (7) is used in place of the equation (3).

$$N_x \leq N2 + S_B \cdot d_B \qquad (7)$$

where N2 is a predetermined closing cushioning travel distance of a closing cushioning control start position CCS from the fully closed position CP. The closing cushioning control start position CCS is a position at which the cushioning control for moving the door at a relatively low speed so as not to crash into the doorpost when the door is closing, starts.

In the closing operation, in place of $V_{oc}$ in the equations (4) and (6), $V_{cc}$ is used. $V_{cc}$ is determined in accordance with the closing cushioning speed parameter $P_{cc}$. In the cushioning control, $V_{cc}$ is used in place of $V_{oc}$.

Explanation of Control (2)

Figure 8:
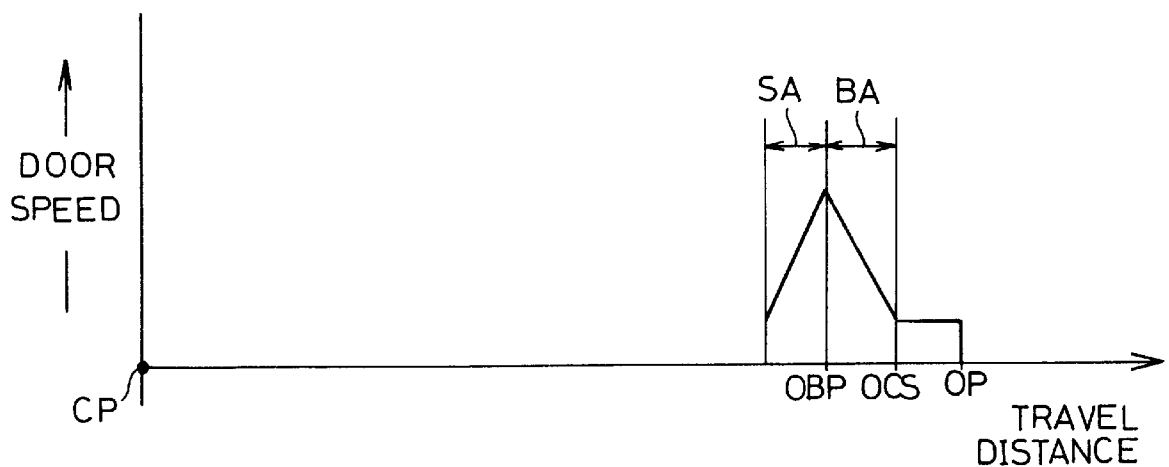
FIG. 8 illustrates a door speed change resulting from the door reaching the braking area after soft-start control starts in the automatic door system of FIG. 1.

When the doors 2a and 2b are closing, an object may have passed through the doorway, so that the door operating signal disappears before the doors reach the fully opened positions OP, and the doors 2a and 2b start closing a predetermined time after the operating signal disappears. In this case, the doors 2a and 2b are decelerated to the opening cushioning speed $V_{oc}$, and then, the closing soft-start control starts to close the doors 2a and 2b. If another object is sensed by the sensor 12 while the doors 2a and 2b are being decelerated to the opening cushioning speed $V_{oc}$, the doors 2a and 2b must be opened, and, for that purpose, the opening soft-start control, stabilization waiting control, high-speed control, braking control, and cushioning control are carried out. It may happen that the ending condition as defined by the equation (3) is fulfilled during any of the opening soft-start control, the opening stabilization waiting control or the opening high-speed control. In this case, the braking control is immediately started. As an example, FIG. 8 shows the door operation which takes place when the condition defined by the equation (3) is fulfilled when the opening soft-start control is being carried out.

After a human has passed through the doorway, the doors 2a and 2b are closed. During the closing operation, the sensor 12 may sense another object approaching the doors. In preparation for re-opening the doors 2a and 2b, they are decelerated. Assume that the object changes its mind and goes away from the doors. Then, the doors must be closed again. In this case, the door control is performed, beginning with the soft-start control. When the doors 2a and 2b reach the closing braking control start position CBP during the second closing operation, the braking control takes place immediately.

Description of Software

The programs the CPU 14 executes to perform the controls (1) and (2) are now described with reference to flow charts shown in FIGS. 9 through 16.

Figure 9:
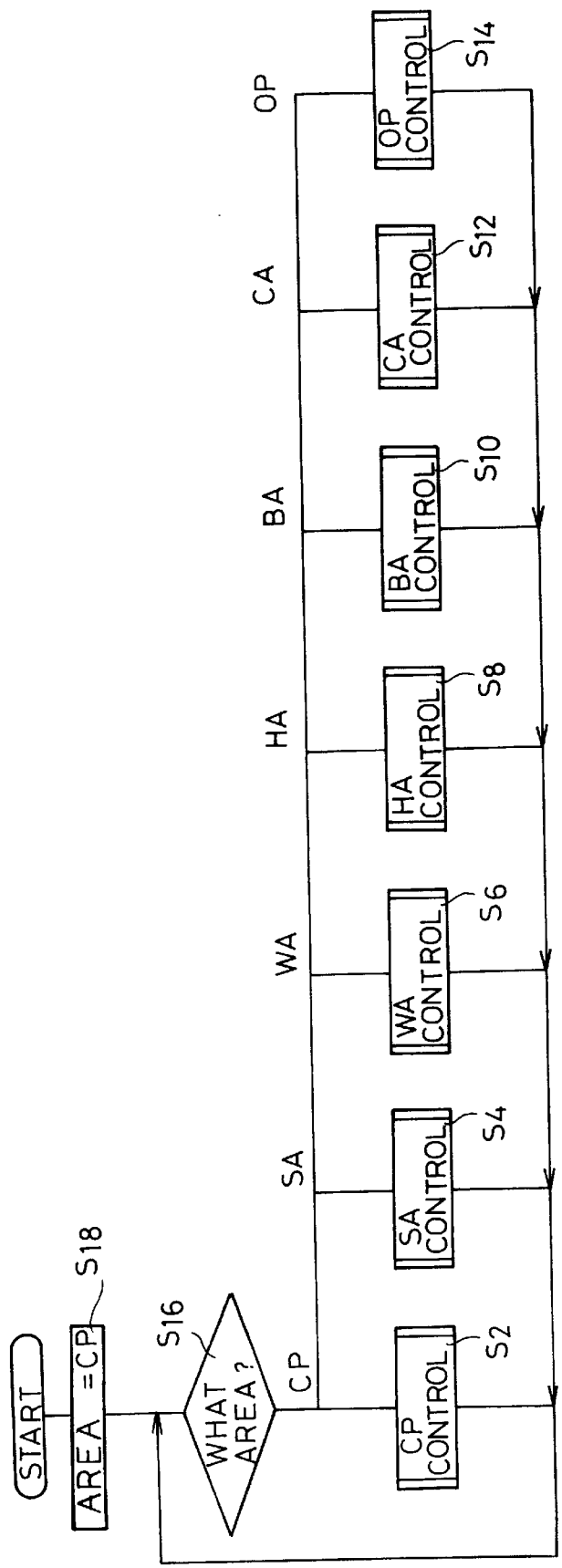
FIG. 9 is a flow chart illustrating a main program of a control unit of the automatic door system of FIG. 1.

As shown in FIG. 9, the following seven subroutines are used.

CP Control Subroutine: Control performed when the doors 2a and 2b are in the fully closed position CP (Step S2).

SA Control Subroutine: Control performed when the doors 2a and 2b are in the soft-start control area SA (Step S4).

WA Control Subroutine: Control performed when the doors 2a and 2b are in the stabilization waiting control area WA (Step S6).

HA Control Subroutine: Control performed when the doors 2a and 2b are in the high speed control area HA (Step S8).

BA Control Subroutine: Control performed when the doors 2a and 2b are in the braking control area BA (Step S10).

CA Control Subroutine: Control performed when the doors 2a and 2b are in the cushioning control area CA (Step S12).

OP Control Subroutine: Control performed when the doors 2a and 2b are in the fully opened position OP (Step S14).

Which one of the seven control subroutines should be executed is determined by an area representative value in an area memory provided in the CPU 14 or in the memory unit 18 (Step S16). The area representative value represents the current area in which the doors 2a and 2b are.

The program starts when power is supplied to the controller 1 and the doors 2a and 2b are in the fully closed position CP (Step S18). After Step S18, Step S16 is executed. When the value in the area memory indicates that the doors 2a and 2b are in the fully closed position CP, the CP control subroutine of Step S2 is executed.

Figure 10:
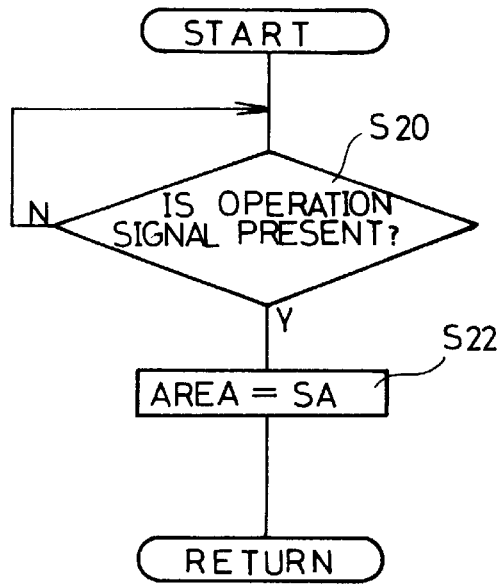
FIG. 10 is a flow chart of the CP control subroutine of FIG. 9.

The CP control subroutine is shown in FIG. 10, in which whether a door operating signal is applied from the sensor 12 or not is judged in Step S20. If a door operating signal has not yet been supplied, Step S20 is repeated until the CPU 14 receives it. In this state, the doors 2a and 2b are remain in the fully closed position CP. When a door operating signal is applied to the CPU 14, the area representative value in the area memory is changed to a value representing the soft-start control area SA (Step S22), and the CP control subroutine is ended.

Figure 11:
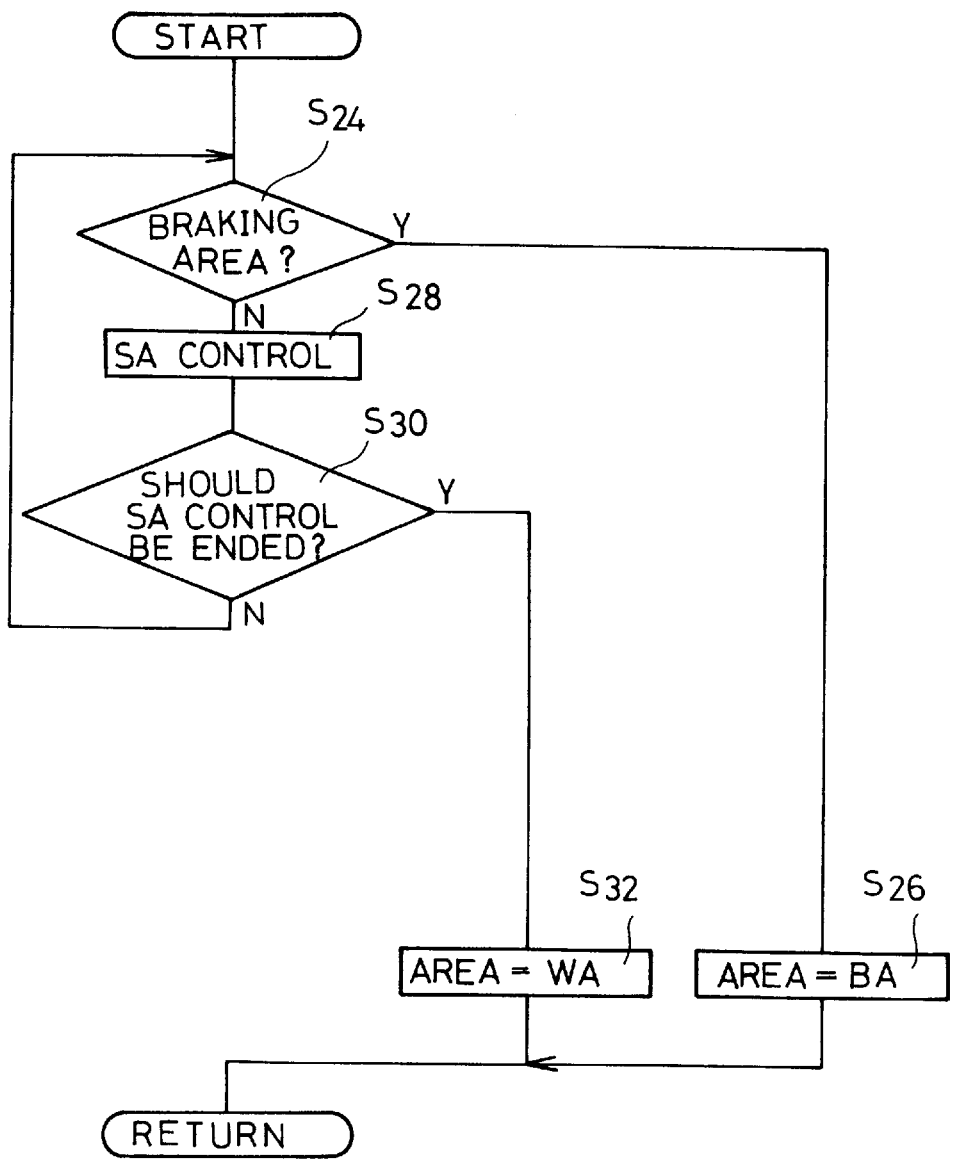
FIG. 11 is a flow chart of the SA control subroutine of FIG. 9.

When the CP control subroutine is finished, Step S16 is executed. Since the area representative value in the area memory indicates the soft-start control area SA, the SA control subroutine of Step S4 is executed. As shown in FIG. 11, in the SA control subroutine, whether the doors 2a and 2b are in the braking control start position OBP at which the braking control is to be started, is judged (Step S24). This judgment is made by determining if the ending condition represented by the equation (3) is fulfilled. Step S24 is to determine whether the control (2) should be done or not. If it is determined that the ending condition or equation (3) is fulfilled in Step S24, which means that the doors 2a and 2b are at the braking control start position OBP, a value representing the braking control area BA is set in the area memory (Step S26), and the SA control subroutine (Step S4) ends. Then, the later-mentioned BA control subroutine is executed.

If it is determined that the doors 2a and 2b are not in the braking control start position OBP, the SA control is executed (Step S28). In this control, the duty ratio $D_U(X)$ of the PWM signal to be applied to the motor drive unit 10 is set to the duty ratio $D_{UC}$ as determined in accordance with the starting torque parameter $P_s$, multiplied by a current step S.

Next, whether the condition for ending the SA control is fulfilled or not is judged (Step S30). The condition for ending the SA control is as follows. The SA control can be ended if the current step S is the opening speed parameter $P_{oh}$ multiplied by 2 when the doors are opened the first time every day after power is applied to the controller 1. When the doors are opened the second time or subsequent time after power is initially applied to the controller 1, the SA control can be ended when the current step number S is equal to the average duty ratio $D_{Ua}$ at the end of the high speed control area HA divided by $D_{UC}$. If the SA control ending condition has not been fulfilled yet, the processing returns to Step S24. If the ending condition has been fulfilled, the area representative value in the area memory is altered to the value representative of the stabilization waiting area WA (Step 32), and the SA control subroutine is ended.

When the area representative value in the area memory is a value representative of the stabilization waiting area WA, the processing advances through Step S16 to Step S6 where the WA control subroutine is executed.

Figure 12:
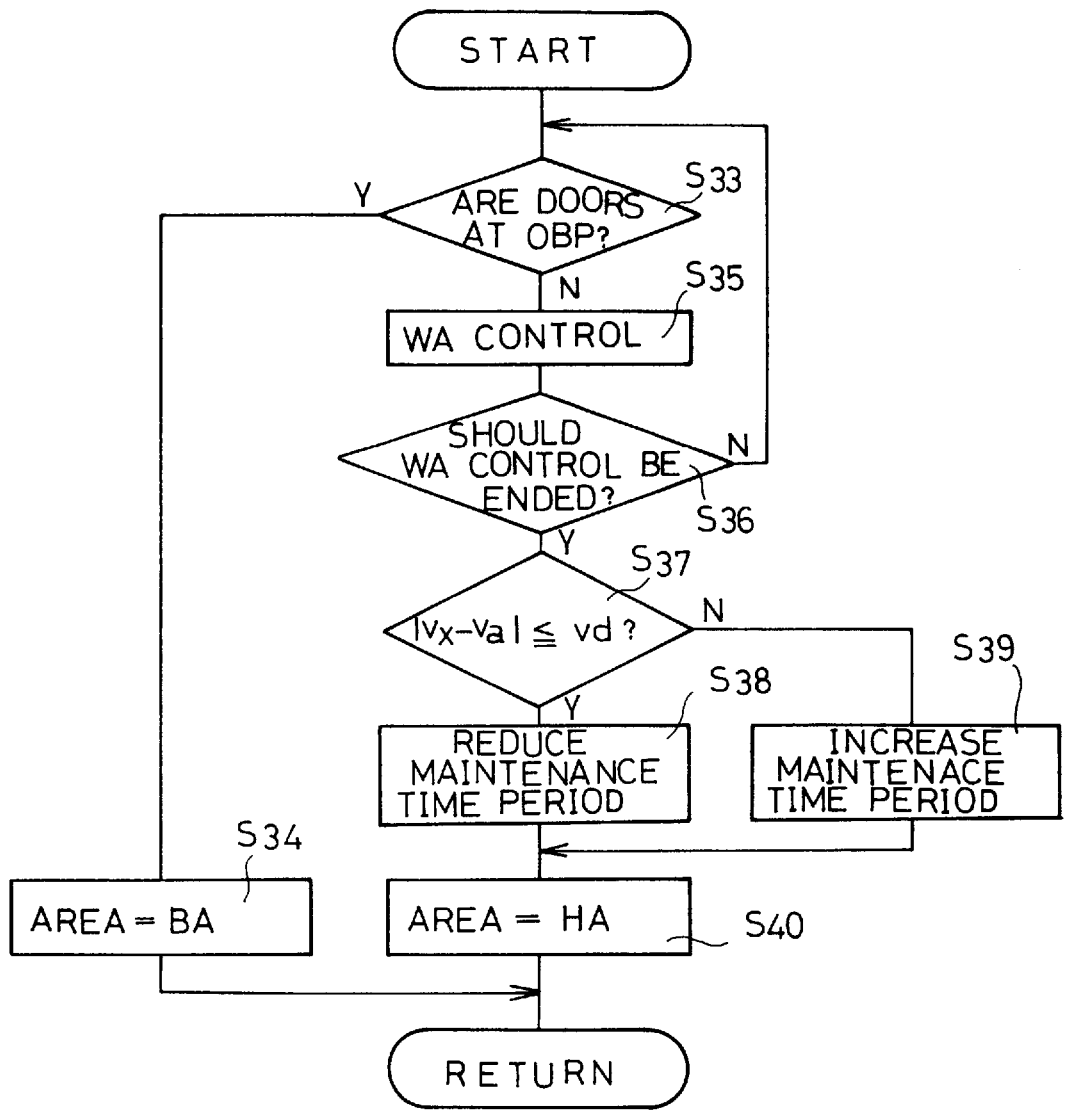
FIG. 12 is a flow chart of the WA control subroutine of FIG. 9.

As shown in FIG. 12, the WA control subroutine judges whether the doors 2a and 2b are at the braking control start position OBP (Step S33), as in Step S24. If the doors 2a and 2b are at the position OBP, the value in the area memory is changed to a value representative of the braking control area BA (Step S34), and the WA control subroutine is ended.

If Step S33 judges that the doors 2a and 2b are not in the braking control start position OBP, the WA control is started (Step S35). In the WA control, the PWM signal having the duty ratio at the end of the SA control is continuously applied to the motor drive unit 10, and, then, whether the WA control ending condition is fulfilled or not is judged (Snot is judged (Step S38). This judgment is made by determining whether a predetermined duty-ratio maintenance time period has elapsed since the start of the WA control subroutine. If the control ending condition has not been fulfilled yet, the processing returns to Step S33. If the control ending condition has been fulfilled, the absolute value of the difference between the current door speed $V_x$ and the aimed speed $V_a$ is calculated, and the determination as to whether the absolute value is not greater than a predetermined value Vd (Step S37) is made. If the absolute value is equal to or less than $V_d$, the maintenance time period is reduced by a predetermined amount (Step S38). If the absolute value is larger than $V_d$, the maintenance time period is increased by a predetermined amount (Step S39). Following Step S38 or S39, the value in the area memory is changed to a value representative of the high-speed control area HA (Step S40), and the WA control subroutine is ended.

Figure 13:
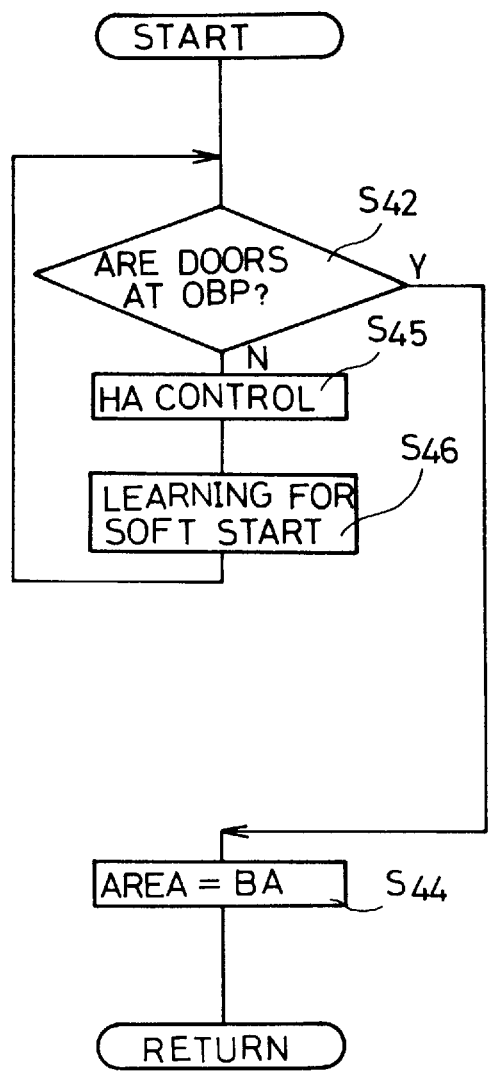
FIG. 13 is a flow chart of the HA control subroutine of FIG. 9.

With the value in the area memory being a value representative of the high-speed control area HA, the program advances through Step S16 to Step S8, and the HA control subroutine is executed. As shown in FIG. 13, in the HA control subroutine, whether the doors 2a and 2b are at the braking control start position OBP or not is judged (Step S42). If the doors 2a and 2b are at the position OBP, the value in the area memory is changed to the value representative of the braking control area BA (Step S44), and the subroutine is ended.

If the doors 2a and 2b are not at the braking control start position, the HA control is performed (Step S45). In the HA control, each time the current door speed $V_x$ is determined, the duty ratio of the PWM signal to be applied to the motor drive unit 10 is calculated in accordance with the equation (1). After that, the CPU 14 do learning for the soft-start control of the next door operation. In other words, the average duty ratio $D_{Ua}(X)$ to be used to determine the door speed at the end of the soft-start control area SA in the next door opening operation is calculated in accordance with the equation (2) (Step S46). However, as the average $D_{Ua}(X)$ immediately after the start of the HA control, the current duty ratio $D_U(X)$ is used. From Step S46, the program returns to Step S42. If it is judged in Step S42 that the doors 2a and 2b have reached the braking control start position OBP, Step S44 is executed and the value in the area memory is changed to a value representing the braking control area BA. Then, the HA control subroutine is ended.

With the value in the area memory being the value representative of the braking control area BA, the execution of the program advances through Step S16 to Step S10, and the BA control subroutine is performed. In other words, the BA control subroutine is executed whenever the doors 2a and 2b are at the braking control start position OBP, regardless of whether any of the soft-start control, the stabilization waiting control and the high-speed control is being performed.

Figure 14:
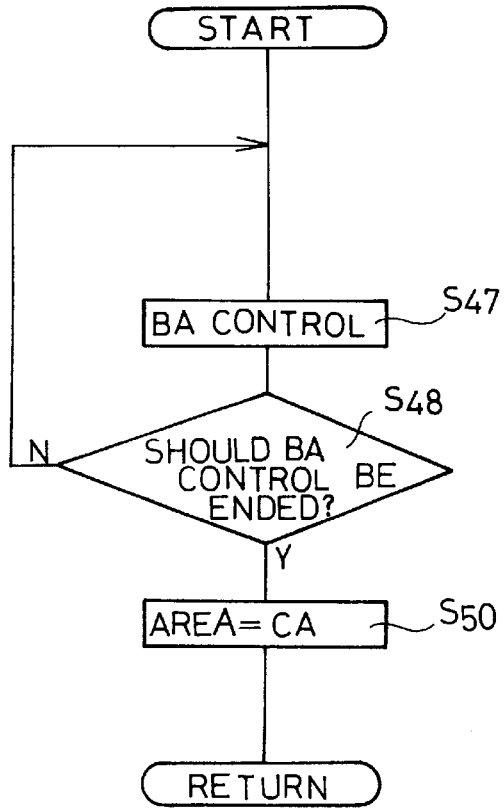
FIG. 14 is a flow chart of the BA control subroutine of FIG. 9.

As shown in FIG. 14, in the BA control subroutine, the braking control (BA control) is performed (Step S47). In the BA control, the aimed speed $V_b(S)$ is calculated in accordance with the equation (4) each time the doors 2a and 2b travel the maintenance distance $d_B$, and the PWM signal having a duty ratio $D_U(X)$ calculated in accordance with the equation (5) is applied to the motor drive unit 10. The duty ratio is altered each time the speed $V_x$ of the doors 2a and 2b is calculated.

After Step S47, whether the BA control should be ended or not is judged (Step S48). This judgment is done by determining when the aimed speed $V_b(S)$ becomes equal to the opening aimed cushioning speed $V_{oc}(S)$. If the condition for ending the BA control has not been fulfilled, the processing returns to Step S47. If it is judged that the BA control should be ended, the value in the area memory is replaced by a value representative of the cushioning control area CA (Step S50), and the BA control subroutine ends.

Figure 15:
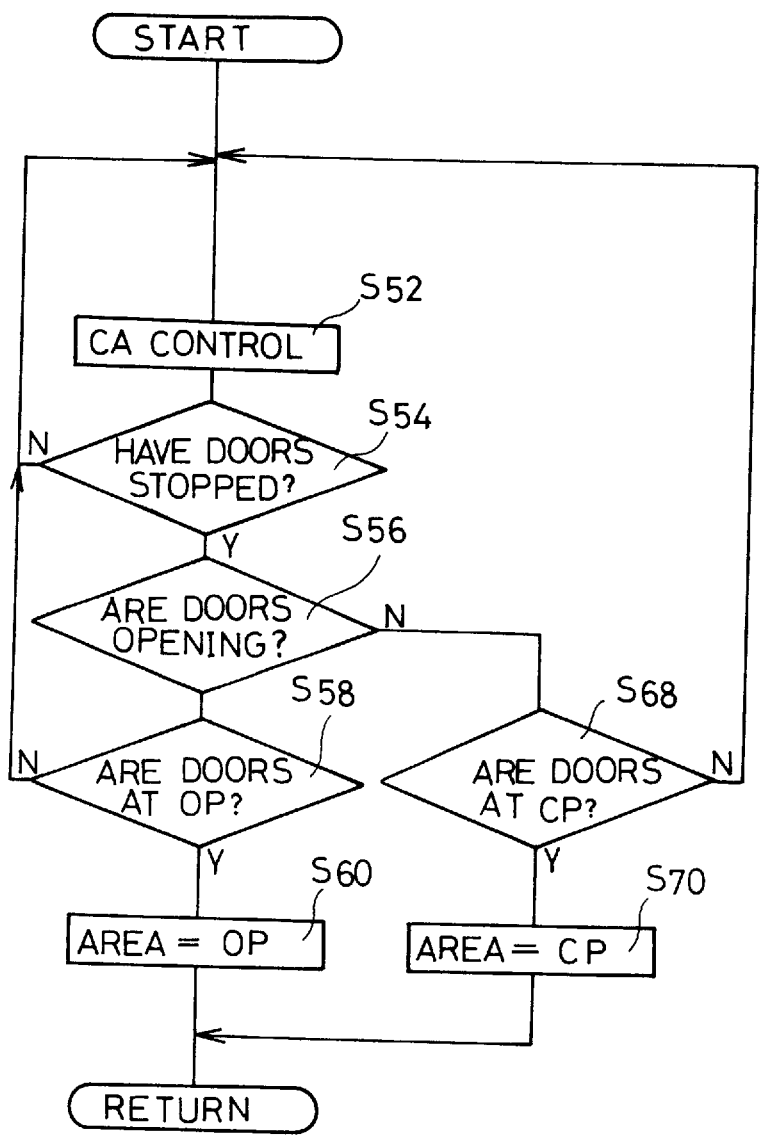
FIG. 15 is a flow chart of the CA control subroutine of FIG. 9.

Since the value in the area memory represents the cushioning control area CA, the program advances through Step S16 to Step S12, and the CA control subroutine is executed. As shown in FIG. 15, in this subroutine, first the cushioning control (CA control) is performed (Step S52). In the CA control, each time the door speed $V_x$ is determined, the PWM signal having the duty ratio $D_U(X)$ computed in accordance with the equation (6) is applied to the motor drive unit 10.

After that, whether the doors 2a and 2b have stopped moving or not is judged (Step S54). In other words, whether the speed $V_x$ of the doors 2a and 2b is zero (0) or not is judged. If the speed $V_z$ is not zero, the processing returns to Step S52. If the speed $V_x$ is zero, whether the doors 2a and 2b are in the opening operation or closing operation is judged (Step S56).

Since the door is opening, it is judged whether the doors 2a and 2b are in the fully opened position OP or not (Step S58), by determining whether the count $N_x$ of the door position counter is N or not. If the doors are not at the fully opened position OP, the processing returns to Step S52. If the doors are at the fully opened position OP, the area value in the area memory is set to a value representative of the fully opened position OP (Step S60), and the CA control subroutine ends.

Figure 16:
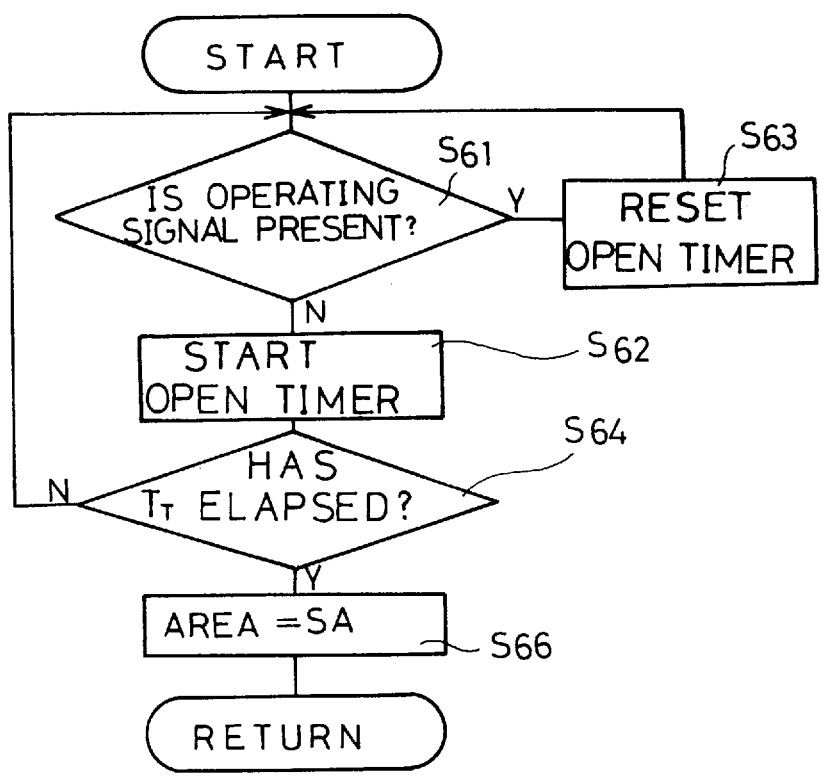
FIG. 16 is a flow chart of the OP control subroutine of FIG. 9.

Since the value in the area memory is the value representing the fully opened position OP, the processing advances through Step S16 to Step S14, and the OP control subroutine shown in FIG. 16 is performed. As shown in FIG. 16, in the OP control subroutine, whether a door operating signal is applied to the CPU 14 or not is judged (Step S61). If the answer is NO, the open-timer starts counting the open time period of the doors (Step S62). Whether the open time period $T_T$ has elapsed or not is judged in Step S64. If it is judged in Step S61 that a door operating signal is applied to the CPU 14, the open-timer is reset (Step S63) and Step S61 is executed again. Thus, as long as a door operating signal is applied to the CPU 14, the open-timer is maintained in the reset state. When a door operating signal is applied to the CPU 14 while the open-timer is counting, the open-timer is reset, too.

If it is judged in Step S64 that the open time period $T_T$ has not yet elapsed, the processing returns to Step S61. On the other hand, if the open time period $T_T$ has elapsed, the area memory is set to a value representative of the SA control (Step S66), and the OP control subroutine ends. Thus, if no door operating signal is applied to the CPU 14, i.e. if no object is sensed, for the open time period $T_T$ after the arrival to the fully opened position OP of the doors 2a and 2b, the closing operation of the doors 2a and 2b is started.

For the closing operation, the SA control subroutine S4, the WA control subroutine S6, the HA control subroutine S8, the BA control subroutine S10, and the CA control subroutine S12 are successively performed in the named order, in a similar manner to the door opening operation described above. However, for the closing operation, $P_{ch}$ is used in place of $P_{oh}$ in the SA control subroutine, and $V_{ch}$ is used in place of $V_{oh}$ in the HA control subroutine. $V_{ch}$ is determined in accordance with the opening speed parameter $P_{ch}$. Further, in order to make the judgment whether the doors are at the braking control start position CBP, the equation (7) is used instead of the equation (3). In the CA control subroutine shown in FIG. 15 during the closing operation, the answer to the question made in Step S56 is NO, and, therefore, whether the doors 2a and 2b are at the fully closed position CP or not is judged (Step S68). When the doors 2a and 2b are not at the fully closed positions CP, Step 52 is executed again. On the other hand, if the doors 2a and 2b are at the fully closed position CP, the area memory is set to a value representing the fully closed position CP (Step S70), and the CA subroutine during the closing operation ends. Then, the processing advances through Step S16 to Step S2, and the CP control subroutine is performed.

What is claimed is:

1. A controller for an automatic door system for controlling a motor which operates to open and close a door, comprising:

a position detecting unit for detecting a position of said door in each door operation and generating a position representative signal representative of the position of said door;

a motor drive unit causing said motor to produce driving and braking forces; and a control unit for applying to said motor drive unit a control signal prepared on the basis of said position representative signal;

wherein said control unit includes output means which develops said control signal for controlling the speed of said door at a position represented by said position representative signal to an aimed speed for that door position; and said motor drive unit causes said motor to produce alternately a driving force and a braking force in accordance with said control signal.

2. The controller according to claim 1 wherein said control signal supplied by said control unit to said motor drive unit is a PWM signal which alternates between first and second states, and said motor drive unit causes said motor to produce a driving force when said PWM signal is in said first state, and a braking force when said PWM signal is in said second state.

3. The controller according to claim 1 wherein said output means provides said control signal for making the speed of said door equal to an aimed door speed of one of a plurality of areas in each door operation in which said door is currently travelling, said areas including a high speed area where said door travels at a high speed, a braking area following said high speed area, where said door is decelerated, and a cushioning area following said braking area, where said door travels at a relatively low speed before it stops.

4. A controller for an automatic door system for controlling a motor which operates to open and close a door, comprising:

a motor drive unit for driving said motor; and a control unit for supplying a PWM signal to said motor drive unit;

wherein said control unit includes approximating means for producing said PWM signal which causes said door to travel at an increasing speed in an accelerating area and to travel at a high speed in a high speed area following said accelerating area in each of door operation in which said door moves from an opened position of said door to a closed position and door operation in which said door moves from said closed position to said opened position;

said approximating means making the PWM signal at a transition from said accelerating area to said high speed area in a current door operation approximate to the PWM signal in said high speed area in the immediately preceding door operation, in accordance with a stabilized PWM signal in said high speed area in said immediately preceding door operation.

5. The controller according to claim 4 wherein said control unit includes means for gradually increasing said PWM signal over an area from the start of said accelerating area to the transition from said accelerating area to said high speed area, in accordance with the value of the stabilized PWM signal in said high speed area in an immediately preceding door operation.

6. The controller according to claim 4 wherein said control unit includes means for maintaining the PWM signal occurring at the transition from said accelerating area to said high speed area, over a region between said accelerating area and said high speed area.

7. The controller according to claim 6 wherein said control unit compares the speed of said door at the end of a maintenance time period in which the PWM signal occurring at the transition from said accelerating area to said high speed area is maintained, with an aimed speed for said high speed area, and adjusts said maintenance time period in accordance with the result of said comparison in an immediately preceding door operation.

8. The controller according to claim 4 wherein said approximating means approximates the PWM signal at the transition from said accelerating area to said high speed area to an average of said PWM signal in said high speed area in an immediately preceding door operation.

9. The controller according to claim 4 wherein said control unit includes means for determining the PWM signal for the transition from said accelerating area to said high speed area in accordance with initial values corresponding to various dimensions of said door when the stabilized PWM signal in said high speed area is not available.

10. A controller for an automatic door system for controlling a motor which operates to open and close a door, comprising:

a motor drive unit causing said motor to produce driving and braking forces; and a control unit for supplying a control signal to said motor drive unit;

wherein said control unit includes:

means for repeatedly computing a length of a braking area required for decreasing the speed of said door in a number of steps from a current speed of said door at the beginning of a cushioning area in which said door moves at a relatively low speed before said door stops moving, the amount of decrease of speed for each of the steps being fixed; and output means for making a judgment as to whether said door has reached a braking initiation position at which said braking is to be initiated each time the length of said braking area is computed, and outputting said control signal for initiating the deceleration of said door when said door is judged to have reached said braking initiation position, said braking initiation position being determined on the basis of the computed length of said braking area and a preset length of said cushioning area.

11. The controller according to claim 10 wherein:

said control signal which said control unit supplies to said motor drive unit is a PWM signal; and said control unit computes the length of said braking area on the basis of the number of steps required for reducing the value of said PWM signal for a current speed of said door to the value of said PWM signal for the speed of said door at the beginning of said cushioning area.

12. The controller according to claim 11 wherein said control unit computes the length of said braking area from the number of steps in said braking area, and a user-selectable maintenance distance per step.

13. The controller according to claim 11 wherein:

said control unit sets an aimed speed for each of said steps in said braking area; and said control unit includes means for outputting a PWM signal for decreasing the speed of the door to the respective aimed speeds.

14. The controller according to claim 10 wherein said control unit includes means for initiating said braking area at any desired position in any of a plurality of areas including an accelerating area in which said door travels at an increasing speed and a high speed area following said accelerating area in which said door travels at a high speed.

* * * * *